(12) United States Patent
Ito et al.

(10) Patent No.: US 9,483,222 B2
(45) Date of Patent: *Nov. 1, 2016

(54) POS SYSTEM, DATA PROCESSING DEVICE, AND CONTROL METHOD OF A POS SYSTEM

(71) Applicant: Seiko Epson Corporation, Tokyo (JP)

(72) Inventors: Masahiro Ito, Matsumoto (JP); Shigeru Hirai, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,426

(22) Filed: Feb. 16, 2016

(65) Prior Publication Data

US 2016/0162238 A1 Jun. 9, 2016

Related U.S. Application Data

(63) Continuation of application No. 14/618,504, filed on Feb. 10, 2015, now Pat. No. 9,311,029.

(30) Foreign Application Priority Data

Feb. 24, 2014 (JP) .................................. 2014-032868

(51) Int. Cl.
 G06F 3/12 (2006.01)
 G06Q 20/20 (2012.01)
 G07G 1/12 (2006.01)
(52) U.S. Cl.
 CPC ............. *G06F 3/1285* (2013.01); *G06F 3/125* (2013.01); *G06F 3/1208* (2013.01); *G06F 3/1231* (2013.01); *G06Q 20/20* (2013.01); *G06Q 20/209* (2013.01); *G07G 1/12* (2013.01)

(58) Field of Classification Search
 USPC ........................................................ 358/1.14
 See application file for complete search history.

(56) References Cited

U.S. PATENT DOCUMENTS

| | | | |
|---|---|---|---|
| 2004/0041022 A1* | 3/2004 | Minowa | G06Q 30/02 235/383 |
| 2005/0209963 A1* | 9/2005 | Momose | G06F 3/122 705/39 |
| 2005/0211773 A1* | 9/2005 | Nobutani | G06Q 20/20 235/383 |
| 2007/0206209 A1 | 9/2007 | Mount | |
| 2011/0184822 A1 | 7/2011 | Matkovic | |
| 2012/0057184 A1 | 3/2012 | Furuhata et al. | |
| 2013/0314727 A1 | 11/2013 | Furuhata et al. | |
| 2014/0022581 A1 | 1/2014 | Furuhata et al. | |

FOREIGN PATENT DOCUMENTS

| | | |
|---|---|---|
| JP | 2012-058810 A | 3/2012 |
| JP | 2013-127721 | 6/2013 |

* cited by examiner

*Primary Examiner* — Ngon Nguyen

(57) ABSTRACT

A POS system comprises a printer and a network-connected data processor. The printer stores identification information and prints a receipt based on print data including transaction information. A transmission unit of the printer transmits over the network the print data and identification information to the data processor. The data processor stores relation information linking layout information for the printed receipt to the received identification information, and acquires the layout information related to the identification information based on the stored relation information, and based on the acquired layout information, analyze the print data.

16 Claims, 13 Drawing Sheets

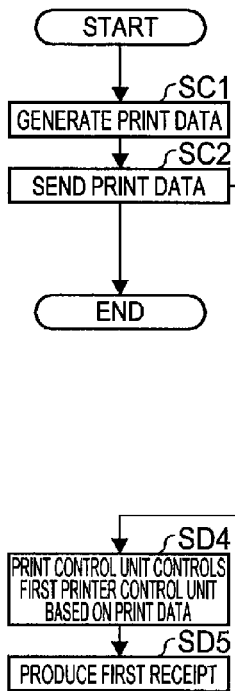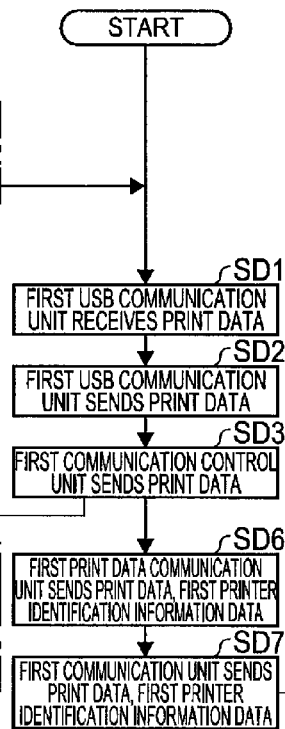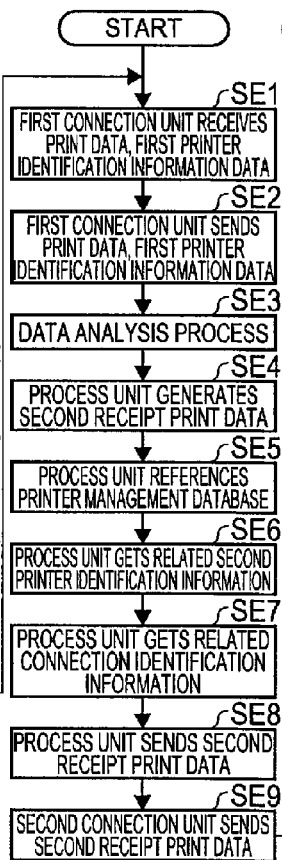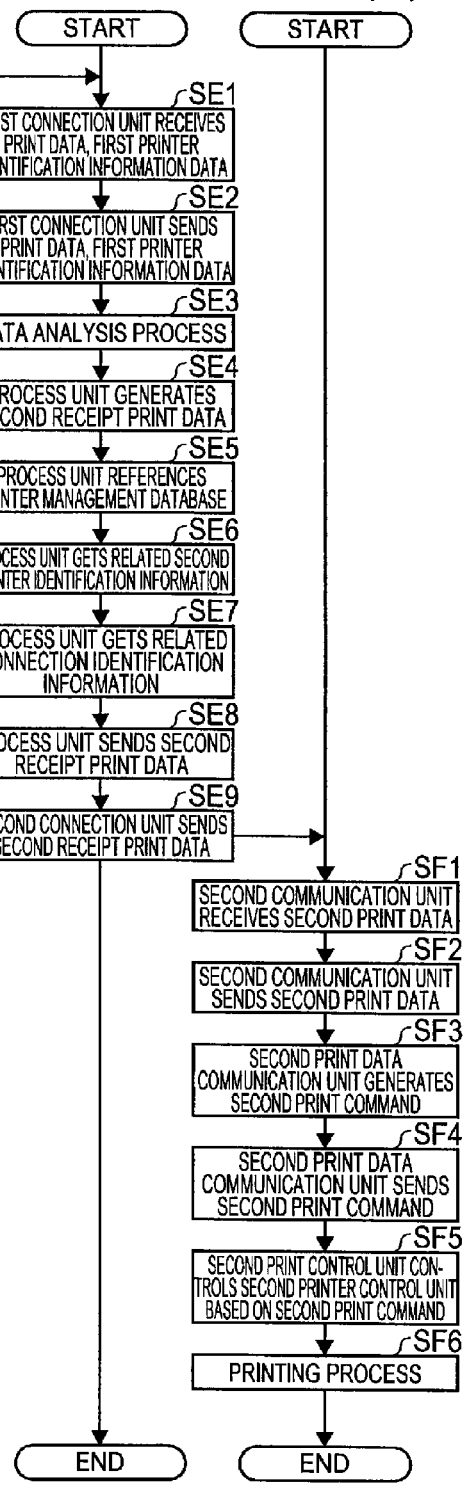

FIG. 6 (A1)

A_Coffee   November 11, 2013
http://ACoffee.Com

HOT FRUIT(Small) $5.00   @1

Total $5.00

Receipt Number No.1234

FIG. 6 (B1)

Ticket #33445  11/15/2013 10:33

B_Coffee

QTY  Description    Price

1    Spice Latte    3.50

Total   3.50 thank you

FIG. 6 (A2)

A_Coffee   <<Date>>
http://ACoffee.Com

<<Items>>     $<<Price>>@<<Quantity>>

Total $<<Total>>

Receipt Number No.<<Receipt No>>

FIG. 6 (B2)

Ticket #<<Receipt No>> <<Date>> <<Time>>

B_Coffee

QTY  Description    Price

<<Quantity>> <<Items>>     <<Price>>

Total  <<Total>> thank you

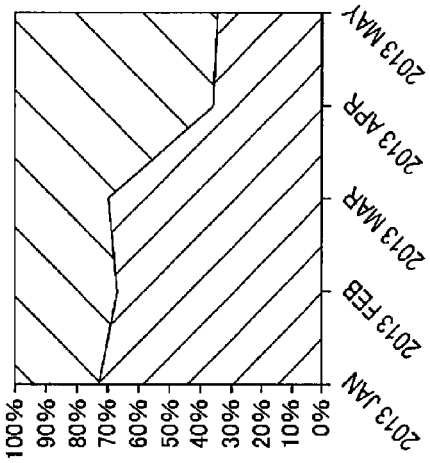
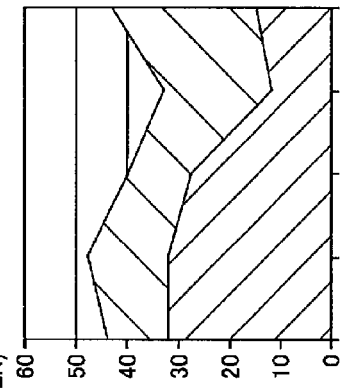
FIG. 9(B)
FIG. 9(A)

POS SYSTEM, DATA PROCESSING DEVICE, AND CONTROL METHOD OF A POS SYSTEM

CROSS-REFERENCE TO RELATED APPLICATION(S)

This application is a continuation of, and claims priority under 35 U.S.C. §120 on, U.S. application Ser. No. 14/618,504, filed Feb. 10, 2015, which claims priority under 35 U.S.C. §119 to Japanese Application no. 2014-032868, filed Feb. 24, 2014. The content of each such related application is incorporated by reference herein in its entirety.

BACKGROUND

1. Technical Field

The present disclosure relates to a POS system that includes a printing device, and to a data processing device used in the POS system.

2. Related Art

Devices with functions for creating print data and analyzing print data that was created are known from the literature. See, for example, JP-A-2012-058810. POS systems in which a POS terminal sends print data to a printer, and the printer prints (produces) a receipt on which transaction information is printed based on the print data are also known. Systems in which a printer and a data processing device such as a server communicate over a network are also known.

When a data processing device is connected to a printer in a POS system such as described above, and the data processing device analyzes the print data, it is necessary to analyze the print data based on the layout of the specific receipt because the layout of the printed receipt may vary according to the print data.

SUMMARY

In a POS system having a data processing device and a printer that prints based on print data received from a POS terminal, an objective of the present invention is to enable the data processing device to analyze the print data appropriately to the layout of the receipt.

One aspect of the invention is a POS system including a printing device and a data processing device connected to the printing device over a network. The printing device includes an identification information storage unit configured to store identification information, a print unit configured to print a receipt based on print data including transaction information, a print control unit configured to control the print unit based on the print data, and a transmission unit configured to transmit over the network the print data and the identification information to the data processing device. The data processing device includes a relation information storage unit configured to store relation information linking layout information for the receipt printed by the print unit to the identification information, a connection unit configured to receive over the network the print data and the identification information transmitted by the printing device, and an analysis unit configured to acquire the layout information related to the identification information received by the connection unit based on the relation information stored in the relation information storage unit, and based on the acquired layout information, analyze the print data.

Preferably, the data processing device also has an analytical result storage unit that stores analytical results based on analysis of the print data. Thus comprised, the data processing device can execute processes such as analyzing sales data using the stored analytical results. The data processing device also preferably has a data communication unit to transmit the analytical results when an appropriate request is received.

Yet further preferably, the data processing device has a processing unit that processes the print data based on the analytical results from the analysis unit. Thus comprised, the data processing device can process print data and generate print data for producing printouts with different layouts, or print data for producing printouts with specific styling applied.

A POS system according to another aspect of the invention also has an external device that prints; and the connection unit of the data processing device connects to the external device and transmits data processed by the processing unit to the external device. Thus comprised, the data processing device can control the external device to print based on print data processed by the data processing unit.

A POS system according to another aspect of the invention also has a second printing device including a second identification information storage unit that stores second identification information, a second print unit that prints a second receipt based on second print data including transaction information, a second print control unit that controls the second print unit based on the second print data, and a second transmission unit that transmits the second print data and the second identification information. The relation information storage unit of the data processing device stores second relation information linking second layout information for the second receipt printed by the second print unit to the second identification information; the connection unit of the data processing device receives the second print data and the second identification information transmitted by the second printing device; and the analysis unit of the data processing device acquires the second layout information related to the second identification information received by the connection unit based on the second relation information stored in the relation information storage unit, and based on the acquired second layout information analyzes the second print data.

Thus comprised the data processing device can analyze print data received from plural different printing devices based on the specific layout used by each printing device.

Another aspect of the invention is a data processing device connected to a printing device over a network. The data processing device includes a connection unit that receives print data over the network from the printing device, the print data instructing printing a receipt, the connection unit also receiving identification information from which the print data is transmitted; a relation information storage unit storing relation information that relationally stores layout information of the receipt printed based on the print data and the identification information; and a analysis unit that acquires the layout information related to the identification information received by the connection unit based on the relation information stored in the relation information storage unit, and based on the acquired layout information analyzes the print data.

Thus comprised, data processing device can analyze print data by referencing the layout of the receipt that is printed based on the print data.

Preferably, the data processing device also has an analytical result storage unit that stores analytical results based on analysis of the print data, a data communication unit to transmit the analytical results, and/or a processing unit to process the print data based on the analytical results.

Thus comprised, the data processing device can execute processes such as analyzing sales data using the stored analytical results, and can process the print data and generate print data for producing printouts with different layouts, or print data for producing printouts with specific styling applied.

In another aspect, the invention is a control method of a data processing device connected to a printing device over a network. The control method comprises receiving, via the network, print data including transaction information and identification information transmitted by the printing device, the printing device being configured to print a receipt based on the transaction information; and analyzing the print data based on layout information related to the received identification information, by the data processing device.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 5(A), 5(B), 5(C) and 5(D) are flow charts showing the operation of devices in the POS system.

FIGS. 6(A1), 6(A2), 6(B1) and 6(B2) show examples of receipts and the layouts thereof.

FIGS. 9(A) and 9(B) show examples of windows displayed by the control server based on the result of print data analysis.

DESCRIPTION OF EMBODIMENTS

A preferred embodiment of the present invention is described below with reference to the accompanying figures.

Figure 1:
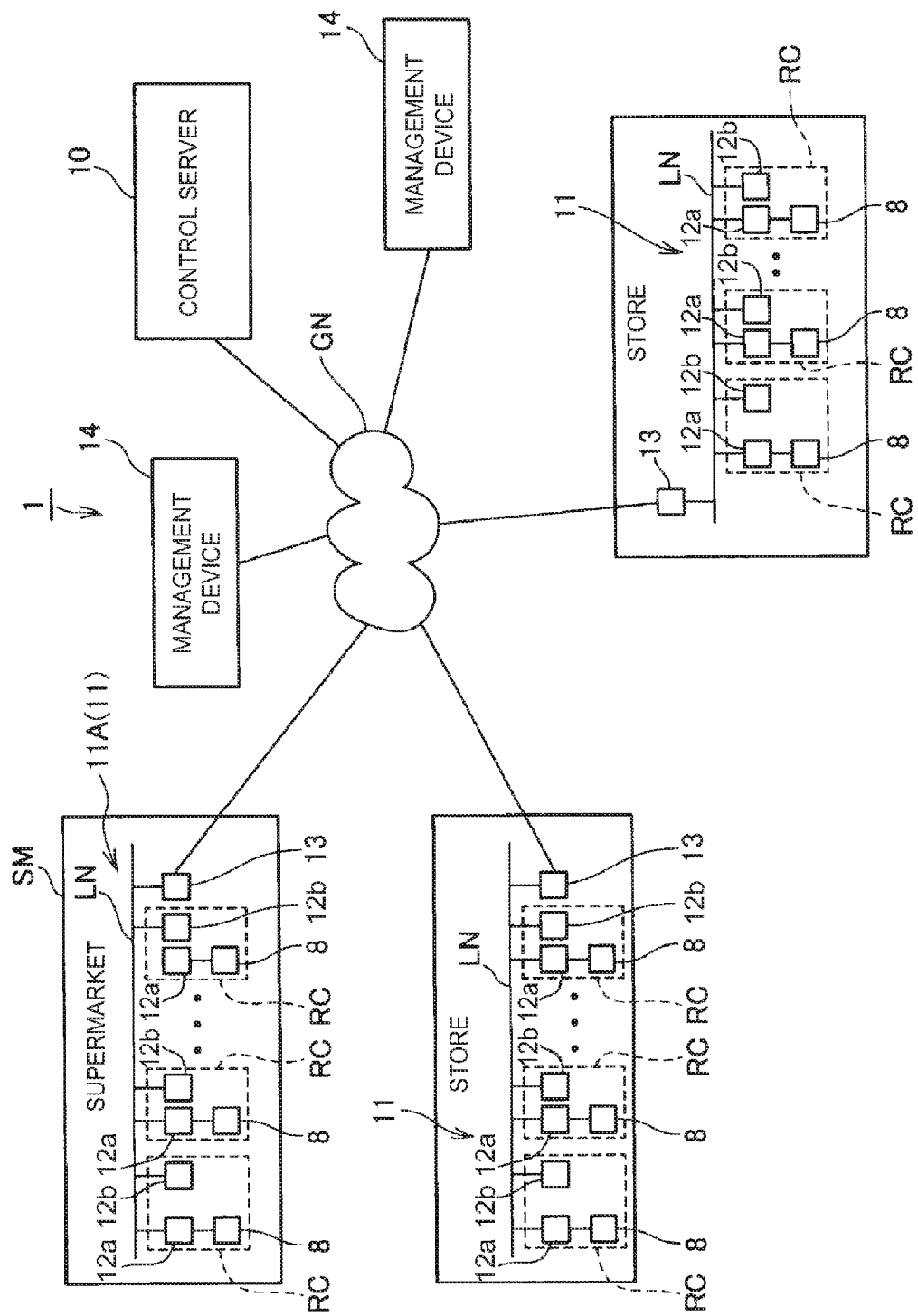
FIG. 1 shows the configuration of a POS system according to an embodiment of the invention.

FIG. 1 shows the configuration of a POS system 1 according to a preferred embodiment of the invention.

As shown in FIG. 1, the POS (point-of-sale) system 1 includes a control server 10 (data processing device). A plurality of store systems 11 connect to the control server 10 through the Internet or other network GN. Plural management devices 14 are also connected to the network GN.

The store system 11 is a system that is used in retail businesses such as supermarkets, convenience stores, department stores, and restaurants. The store system 11 has functions including producing receipts for customers that completed a transaction at the store.

The store system 11 has one or more receipt printers 12a (printing devices) each having a printing function for printing on print media and capable of producing receipts. The store system 11 also has one or a plurality of second printers 12b that also have a print function.

The receipt printers 12a and second printers 12b are connected to a local area network LN deployed in the store. A network communication controller 13 configured with a communication device such as a network router or modem connects to the local area network LN. The receipt printers 12a and second printers 12b access the network GN through the network communication controller 13.

The receipt printer 12a connects to a POS terminal 8 in the store system 11. A POS application and printer driver are installed on the POS terminal 8.

The POS terminal 8 has a POS application execution unit 45a that executes functions according to the POS application, and a printer driver execution unit 45b that executes functions according to the printer driver. The POS terminal 8 controls the receipt printer 12a by means of the POS application execution unit 45a and printer driver execution unit 45b. While described in further detail below, the POS terminal 8 controls the receipt printer 12a to produce a first receipt by generating and sending print data by means of the POS application execution unit 45a and printer driver execution unit 45b to the receipt printer 12a.

While not shown in the figures, a barcode reader that reads barcodes from products or product packaging, and a card reader that reads cards such as customer membership cards, may also connect to the POS terminal 8. By a function of the POS application, the POS terminal 8 accesses a POS server not shown to acquire specific information from product master and customer master databases stored by the POS server. Based on input from the barcode reader, card reader, and input by the checkout clerk to input means such as a keypad according to the customer transaction in the store, the POS terminal 8 acquires information from the product master and customer master databases and generates print data.

While described in detail below, the second printer 12b also produces a second receipt (described below) corresponding to the first receipt by a function of the control server 10 based on the customer transaction at the store.

One or a plurality of checkout counters RC are set up in the store. A receipt printer 12a, a POS terminal 8 that connects to the receipt printer 12a, and a second printer 12b corresponding to the receipt printer 12a are installed at each checkout counter RC.

In the example shown in FIG. 1, the store system 11A is a system used in a supermarket SM. Plural checkout counters RC are set up in the supermarket SM. A receipt printer 12a, a POS terminal 8, and a second printer 12b are installed at each checkout counter RC. The POS terminal 8 sends print data to the receipt printer 12a according to the transaction at the checkout counter RC. The receipt printer 12a then produces a first receipt based on the print data. The second printer 12b at the checkout counter RC also produces a second receipt by a function of the control server 10.

The receipt printers 12a and second printers 12b of the store system 11A access the network GN through the network communication controller 13 of the local area network LN, and communicate through the network GN with the control server 10.

In the POS system 1 according to this embodiment of the invention each receipt printer 12a and second printer 12b of the store system 11 establishes a communication connection with the control server 10, and communicates with the control server 10 through the established communication path. As described further below, the control server 10 gets the print data the POS terminal 8 sent to the receipt printer 12a through the communication path established with the receipt printer 12a, and executes a processes including a process of analyzing the acquired print data.

The control server 10 processes the print data based on the result of analyzing the print data to generate processed print data, and sends the processed print data to the second printer 12b. The second printer 12b then prints a second receipt based on the processed print data.

The management device 14 is a device that manages one or more store systems 11. For example, the management device 14 may be installed in the headquarters of a company that operates multiple stores, and manage the store systems 11 deployed in plural stores of the corporate group.

Figure 2:
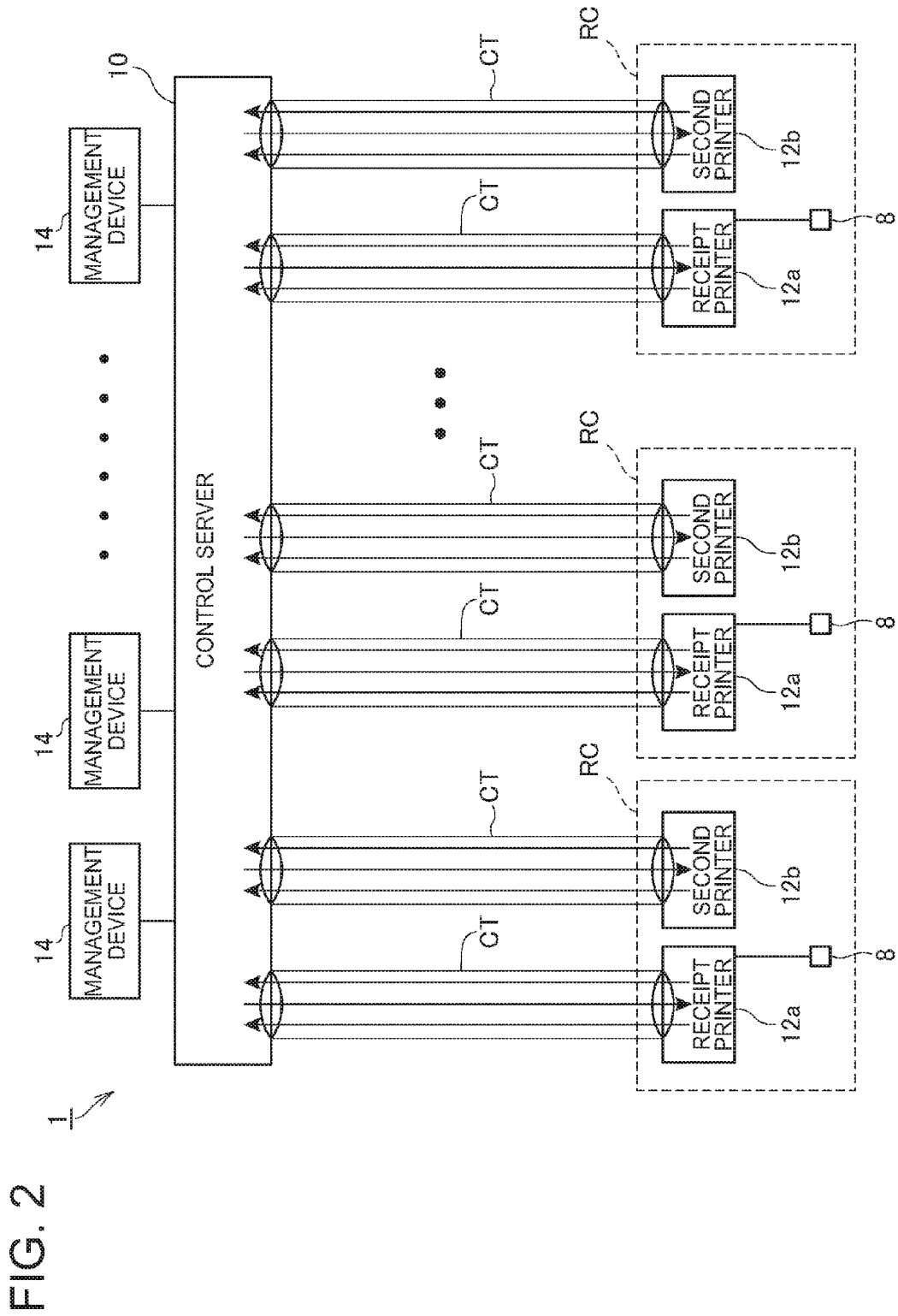
FIG. 2 illustrates communication paths opened between a control server and devices connected to the control server.

FIG. 2 illustrates the communication paths established between the control server 10 and the receipt printers 12a and second printers 12b in the POS system 1.

As shown in FIG. 2, a WebSocket connection CT enabling WebSocket communication is established in the POS system 1 between the control server 10 and the receipt printers 12a in each store system 11. A WebSocket connection CT enabling WebSocket communication is also established in the POS system 1 between the control server 10 and the second printers 12b in the store system 11.

WebSocket is a communication standard that enables asynchronous duplex communication. After a server and client open a WebSocket connection CT using the WebSocket standard, sending and receiving data between the devices uses the WebSocket protocol by means of the connection. It is therefore not necessary to establish a connection every time data is transmitted.

The WebSocket connection CT is a logical communication path for sending and receiving data according to the WebSocket standard and procedures between the receipt printers 12a or second printers 12b and control server 10 connected through the WebSocket connection CT. Therefore, once a receipt printer 12a or second printer 12b and control server 10 handshake and establish a WebSocket connection CT, the receipt printer 12a or second printer 12b and control server 10 can exchange data asynchronously over the WebSocket connection CT. More specifically, the control server 10 can push data to the receipt printer 12a or second printer 12b through the WebSocket connection CT at any time, and the receipt printer 12a or second printer 12b can push data to the control server 10 at the desired time through the WebSocket connection CT.

WebSocket communication is asynchronous, duplex communication between a receipt printer 12a or second printer 12b and the control server 10 through the WebSocket connection CT based on the WebSocket protocol and methods.

As also shown in FIG. 2, the control server 10 is also communicatively connected to the plural management devices 14.

In this embodiment of the invention the control server 10 is a client server in a so-called cloud system in which the receipt printers 12a, second printers 12b and management devices 14 are client devices. The control server 10 can process data, execute specific processes when triggered by receiving a request from a receipt printer 12a, printer 12, management device 14, or other external device or when specific conditions are met, and send data based on the result of the process through the WebSocket connection CT to the receipt printer 12a, second printer 12b, or management device 14.

In FIG. 2 the control server 10 is represented as a single block, but this does not mean that the control server 10 is configured from a single server. For example, the control server 10 may be configured from multiple servers, or it may be a server rendered by a function of a specific system. More specifically, the control server 10 may be any configuration that can execute the processes described herein.

The control server 10 and receipt printer 12a, and the control server 10 and the second printer 12b, communicate according to the WebSocket communication protocol in this embodiment. The invention is not limited to WebSocket communication, however, and other configurations enabling devices to communicate by asynchronous, duplex communication similarly to WebSocket communication may be used.

The POS system 1 thus has multiple (such as a 1000) receipt printers 12a each capable of printing and second printers 12b each capable of printing communicatively connected through a WebSocket connection CT to a control server 10.

The control server 10 can collect data received from the plural receipt printers 12a and second printers 12b connected to plural store systems 11, and manage and analyze information based on the collected data. The accumulated information can be used as so-called "big data."

As described further below, the POS terminal 8 can control the second printer 12b to execute a process corresponding to the print data sent to the receipt printer 12a by a function of the control server 10. A process appropriate to the print data can be executed on the second printer 12b by a function of the control server 10 in this embodiment of the invention by the simple task of connecting the receipt printer 12a and second printer 12b to the network GN. As also described further below, the second printer 12b can also execute processes using a function of the control server 10 without modifying the existing system in which a receipt printer 12a is connected to a POS terminal 8, and without affecting the existing system.

Figure 3:
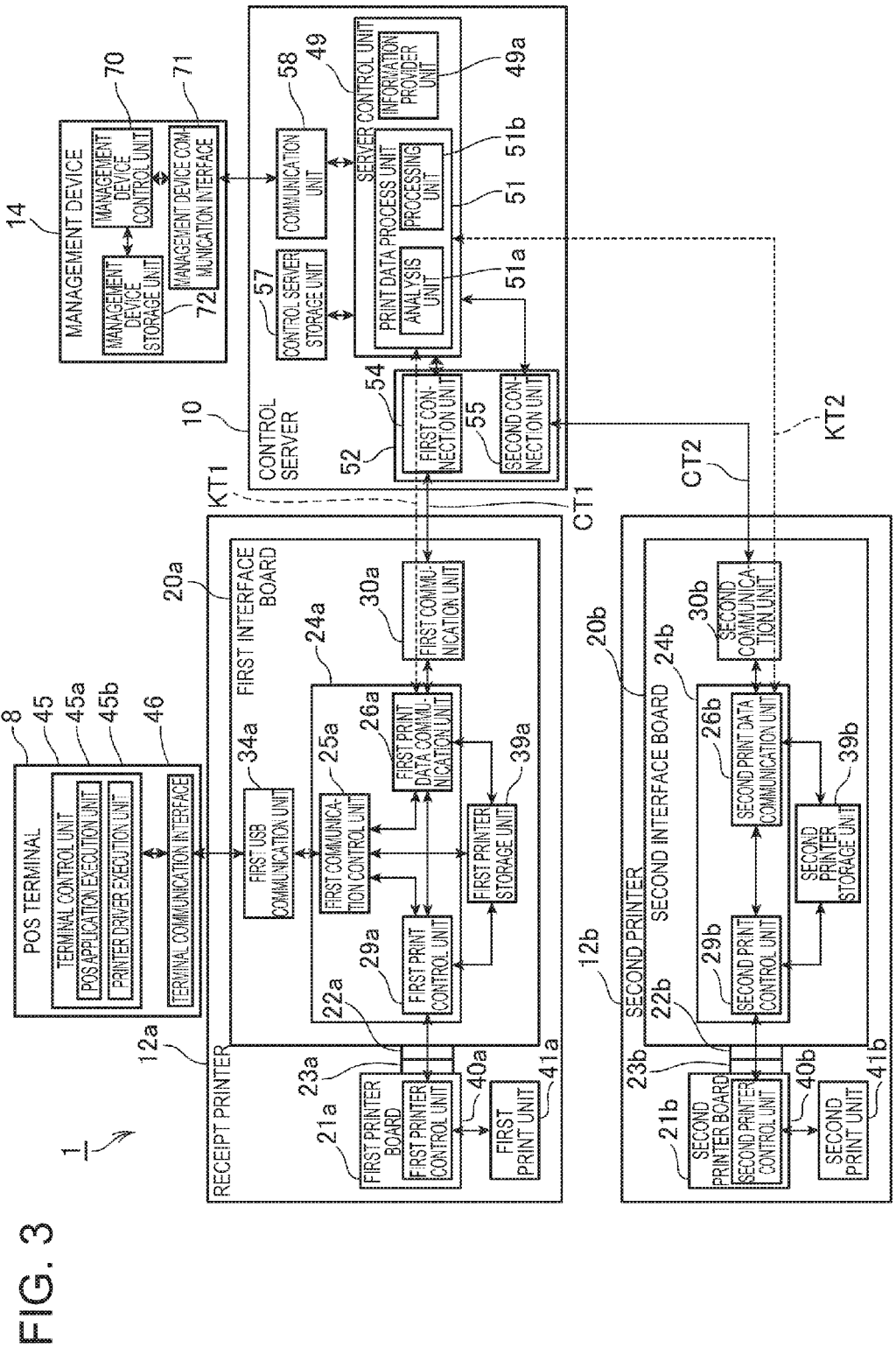
FIG. 3 is a block diagram showing the functional configuration of devices in the POS system.

FIG. 3 is a block diagram showing the functional configuration of the receipt printer 12a, second printer 12b, the POS terminal 8, the control server 10, and the management device 14 in this embodiment of the invention.

As shown in FIG. 3, the receipt printer 12a has a first interface board 20a and a first printer board 21a. These boards are connected by a connector 22a disposed to the first interface board 20a, and a connector 23a disposed to the first printer board 21a. In FIG. 3, the function blocks are shown inside the blocks representing the boards (first interface board 20a and first printer board 21a) inside the block representing the receipt printer 12a. This means the function of one function block is embodied by specific software and hardware (such as a CPU or signal processing circuit) mounted on the circuit board corresponding to the one function block.

The first interface board 20a of the receipt printer 12a includes a first control unit 24a, a first communication unit 30a (transmission unit), a first USB communication unit 34a (reception unit), and a first printer storage unit 39a (identification information storage unit).

The first control unit 24a includes a first communication control unit 25a, a first print data communication unit 26a, and a first print control unit 29a (print control unit). These function blocks are described further below. The functions of the first communication control unit 25a, first print data communication unit 26a, first print control unit 29a, and first communication unit 30a are also described further below.

The first USB communication unit 34a is connected to a USB port not shown, and communicates by the USB protocol with the POS terminal 8 connected through a USB cable.

In this embodiment of the invention, the receipt printer 12a communicates by USB with the POS terminal 8, but configurations using other communication protocols may be used. For example, a configuration that communicates by a serial communication protocol such as RS232-C may be used.

The first printer storage unit 39a stores data. The data the first printer storage unit 39a stores is described further below.

The first printer board 21a of the receipt printer 12a has a first printer control unit 40a. The function of the first printer control unit 40a is described further below.

The receipt printer 12a also has a first print unit 41a (print unit). Roll paper is loaded in the receipt printer 12a. The first print unit 41a has various mechanisms and devices, including a print mechanism for printing on the roll paper set in the receipt printer 12a, a conveyance mechanism for conveying the roll paper, and a cutter mechanism for cutting the roll paper. The first print unit 41a produces receipts.

As shown in FIG. 3, the second printer 12b has a second interface board 20b and a second printer board 21b. These boards are connected by a connector 22b disposed to the second interface board 20b, and a connector 23b disposed to the second printer board 21b.

The second interface board 20b of the second printer 12b includes a second control unit 24b, a second communication unit 30b, and a second printer storage unit 39b. The second control unit 24b includes a second print data communication unit 26b, and a second print control unit 29b as function blocks. These function blocks are described further below. The functions of the second print data communication unit 26b, second print control unit 29b, and second communication unit 30b are also described further below.

The second printer storage unit 39b stores data. The data the second printer storage unit 39b stores is described further below.

The second printer board 21b of the second printer 12b has a second printer control unit 40b. The function of the second printer control unit 40b is described further below.

The second printer 12b also has a second print unit 41b. Roll paper is loaded in the second printer 12b. The second print unit 41b has various mechanisms and devices, including a print mechanism for printing on the roll paper set in the second printer 12b, a conveyance mechanism for conveying the roll paper, and a cutter mechanism for cutting the roll paper.

As shown in FIG. 3, the POS terminal 8 includes a POS terminal control unit 45 and a terminal communication interface 46.

The POS terminal control unit 45 includes a CPU, ROM, RAM, and other peripheral circuits, and controls the POS terminal 8. The function blocks of the POS terminal control unit 45 include a POS application execution unit 45a and a printer driver execution unit 45b.

The function of the POS application execution unit 45a is controlled by the POS application installed on the POS terminal 8. Based on input from the barcode reader, card reader, and input by the checkout clerk to input means such as a keypad according to the transaction performed at the checkout counter RC, the POS application execution unit 45a acquires information from the product master and customer master databases, generates print information data including information related to printing, and outputs to the printer driver execution unit 45b.

The printer driver execution unit 45b is embodied by functions of the printer driver installed on the POS terminal 8. Based on the print information data received from the POS application execution unit 45a, the printer driver execution unit 45b generates and outputs print data according to the command language of the first print unit 41a of the receipt printer 12a.

The terminal communication interface 46 communicates according to a specific communication protocol with the receipt printer 12a as controlled by the POS terminal control unit 45.

As shown in FIG. 3, the control server 10 includes a server control unit 49, a first connection unit 54 (connection unit 52), a second connection unit 55 (connection unit 52), a control server storage unit 57 (related information storage unit, analytical result storage unit), and a data communication unit 58.

A function block of the server control unit 49 is the print data process unit 51. The print data process unit 51 is described further below.

The functions of the first connection unit 54 and second connection unit 55 are also described further below.

The control server storage unit 57 stores data. The data the control server storage unit 57 stores is described further below.

The communication unit 58 communicates according to a specific communication protocol with an external device, including the management device 14, through the network GN as controlled by the server control unit 49.

As shown in FIG. 3, the management device 14 has a management device control unit 70, a management device communication interface 71, and a management device storage unit 72.

The management device control unit 70 includes a CPU, ROM, RAM, and other peripheral circuits, and controls the management device 14.

The management device communication interface 71 communicates according to a specific communication protocol with the control server 10 through the network GN as controlled by the management device control unit 70.

The management device storage unit 72 stores data. The data the management device storage unit 72 stores is described further below.

FIG. 3 shows the relationship between the control server 10 and one receipt printer 12a connected to the control server 10. When multiple receipt printers 12a are connected to the control server 10, the control server 10 establishes a WebSocket connection CT with each receipt printer 12a, and communicates with the receipt printers 12a by the WebSocket standard through the WebSocket connection CT. The same applies to the second printers 12b.

FIG. 3 also shows the relationship between the control server 10 and one management device 14 connected to the control server 10. When multiple management devices 14 are connected to the control server 10, the control server 10 establishes a WebSocket connection CT with each management device 14, and communicates with the management devices 14 through the WebSocket connection CT.

Operation of the receipt printer 12a and the control server 10 when the receipt printer 12a power turns on is described next.

When not specifically differentiating between the receipt printer 12a and the second printer 12b below, they are referred to as simply printer 12.

Figure 4A:
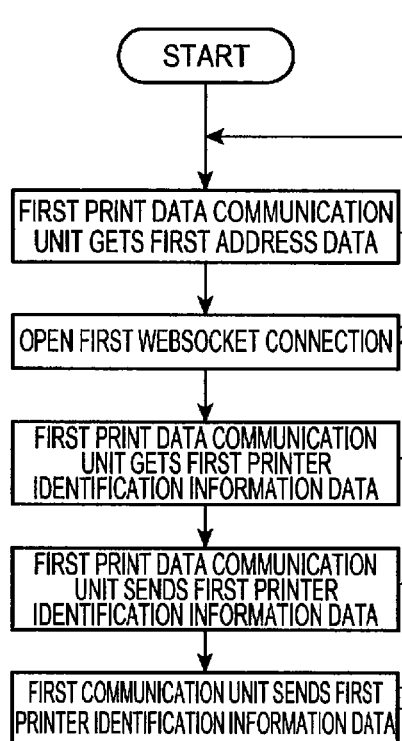
FIGS. 4(A) and 4(B) are flow charts showing the operation of a first printing device and the control server.
Figure 4B:
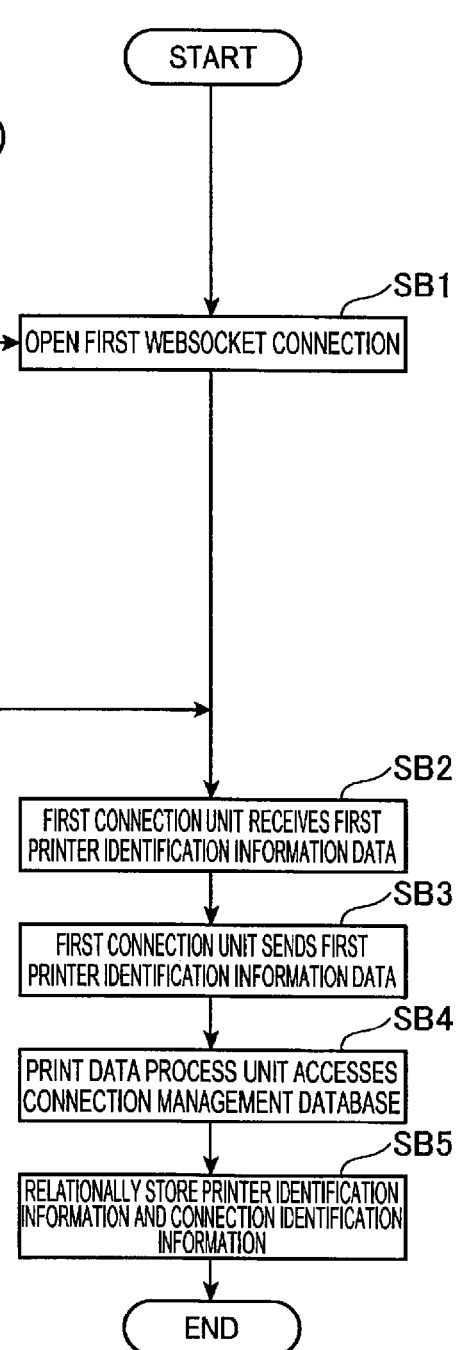

FIG. 4 is a flow chart showing the operation of the receipt printer 12a and the control server 10 after the receipt printer 12a power turns on, column (A) showing the operation of the receipt printer 12a, and (B) showing the operation of the control server 10.

Note that the trigger for the process shown in the flow chart in FIG. 4 is not limited to the power turning on. For example, the process may also be triggered by the receipt printer 12a connecting communicatively to the network GN, or when a command is received from the user.

As shown in FIG. 4 (A), when the receipt printer 12a power turns on (step SX1), the first print data communication unit 26a accesses the first printer storage unit 39a and gets the first address data stored in the first printer storage unit 39a (step SA1).

The first address data is data including the address (such as the domain name, IP address, path name, or port name) of the control server 10 to access when establishing a first WebSocket connection CT1 according to the WebSocket protocol. When opening a WebSocket connection CT according to the WebSocket protocol, the client (the receipt printer 12a in this example) handshakes with the server (the control server 10 in this example) using HTTP (Hypertext Transfer Protocol). When handshaking, the client sends a message containing the domain name of the server, and the first address data is data required to establishes a WebSocket connection CT, including the address to access.

Next, the first print data communication unit 26a accesses the control server 10 based on the address identified by the first address data. Next, the first print data communication unit 26a exchanges the information required to establish a connection with the print data process unit 51 of the control server 10, and establishes a first WebSocket connection CT1 between the first communication unit 30a and the first connection unit 54 (step SA2, step SB1). The first print data communication unit 26a of the receipt printer 12a establishes a first WebSocket connection CT1 when triggered by the receipt printer 12a power turning on even without receiving a request from the control server 10.

The first communication unit 30a and the first connection unit 54 are WebSocket interfaces enabling data communication based on the WebSocket protocol and methods. These function blocks are instantiated using a WebSocket Socket. IO library, for example. This also applies to the second communication unit 30b and second connection unit 55.

The first communication unit 30a has functions for processing data that is received from the first print data communication unit 26a according to WebSocket, and sending the data through the first WebSocket connection CT1 based on WebSocket methods.

The first communication unit 30a also has functions for processing data that is received through the first WebSocket connection CT1 according to WebSocket, and sending to the first print data communication unit 26a. The first connection unit 54, second communication unit 30b, and second connection unit 55 are similarly configured.

By establishing a first WebSocket connection CT1, the receipt printer 12a and the control server 10 can communicate by asynchronous, duplex communication. The control server 10 can push data to the receipt printer 12a through the first WebSocket connection CT1 without receiving a request from the receipt printer 12a operating as a client device. Likewise, the receipt printer 12a can push data to the control server 10 through the first WebSocket connection CT1.

By establishing a first WebSocket connection CT1, the first print data communication unit 26a of the receipt printer 12a and the print data process unit 51 of the control server 10 open a first function unit communication path KT1 based on the first WebSocket connection CT1. The first function unit communication path KT1 is a logical communication path for data communication between the first print data communication unit 26a and the print data process unit 51. The first print data communication unit 26a and print data process unit 51 can communicate by asynchronous duplex communication through the first function unit communication path KT1. Asynchronous duplex communication through the first function unit communication path KT1 is described further below.

Next, the first print data communication unit 26a accesses the first printer storage unit 39a, and gets the first printer identification information data stored in the first printer storage unit 39a (step SA3). The first printer identification information data is data identifying a particular receipt printer 12a. Below, the identification information of a printer 12 is referred to as a printer identification information. The printer identification information may be, for example, the serial number assigned to the printer 12 when the printer 12 was manufactured.

Next, the first print data communication unit 26a sends the first printer identification information data to the first communication unit 30 (step SA4).

The first communication unit 30 sends the received first printer identification information data through the first WebSocket connection CT1 to the control server 10 (step SA5).

As shown in FIG. 1n FIG. 4 (B), the first connection unit 54 of the control server 10 receives the first printer identification information data through the first WebSocket connection CT1 (step SB2). Next, the first connection unit 54 sends the received first printer identification information data to the print data process unit 51 (step SB3).

The print data process unit 51 then accesses the connection management database stored by the control server storage unit 57 (step SB4). The connection management database is a database relationally storing connection identification information identifying the WebSocket connection CT and the printer identification information of the printer 12 for each of the WebSocket connections CT that were established between the control server 10 and printers 12.

Next, the print data process unit 51 creates one record in the connection management database. The print data process unit 51 then relationally stores in the created record the connection identification information of the WebSocket connection CT established in step SB1 (the first WebSocket connection CT1 in this example) and the printer identification information indicated by the first printer identification data that was received (step SB5).

Note that when a WebSocket connection CT is opened, the print data process unit 51 generates connection identification information for that connection that is different from the connection identification information of any other WebSocket connection CT that was already opened. The relationship between the WebSocket connections CT and printers 12 is managed by the process of step SB5.

The print data communication unit 26a of the receipt printer 12a thus establishes a first WebSocket connection CT1 when triggered by the power of the receipt printer 12a turning on without receiving a request from the control server 10. Thus comprised, the user does not need to perform a complicated operation to open a first WebSocket connection CT1. The user also does not need special knowledge to open a first WebSocket connection CT1.

Operation of the receipt printer 12a and control server 10 when establishing a first WebSocket connection CT1 is described above, and the second printer 12b similarly establishes a second WebSocket connection CT2 with the control server 10 when the printer power turns on.

Operation when the second WebSocket connection CT2 is established is described next.

When the power of the second printer 12b turns on, the second print data communication unit 26b exchanges the information required to establish a connection with the print data process unit 51 of the control server 10, and establishes a second WebSocket connection CT2 between the second communication unit 30b and the second connection unit 55. When the connection is established, the print data process unit 51 of the control server 10 relationally stores the connection identification information of the established WebSocket connection CT and the printer identification information indicated of the second printer 12b (referred to below as second printer identification information). A second function unit communication path KT2 based on the connection is also established between the print data process unit 51 of the control server 10 and the second print data communication unit 26b of the second printer 12b when the second WebSocket connection CT2 is established. Data communication through the second WebSocket connection CT2 is described below.

The POS control system 1 is configured from a system including a receipt printer 12a and a POS terminal 8. In this system, the POS terminal 8 generates and sends print data using the POS application execution unit 45a and printer driver execution unit 45b to the receipt printer 12a. Based on the print data, the receipt printer 12a prints with the first print unit 41a and products a first receipt.

Without modifying the program of the POS application, the POS control system 1 can also execute specific processes using functions of the control server 10 using print data the POS terminal 8 sends to the receipt printer 12a.

More specifically, a first interface board 20a is disposed to the receipt printer 12a, and the additional functions embodied by the first interface board 20a are thereby added to the receipt printer 12a. Using these added functions, the receipt printer 12a sends print data through the network GN to the control server 10. The control server 10 executes processes including analyzing the print data based on the received print data.

Operation of devices in the POS control system 1 when the POS terminal 8 sends print data to the receipt printer 12a is described next.

FIG. 5 is a flow chart showing the operation of devices in the POS control system 1 when the POS terminal 8 sends print data to the receipt printer 12a. FIG. 5 (A) shows the operation of the POS terminal 8, (B) shows the operation of the receipt printer 12a, (C) shows the operation of the control server 10, and (D) shows the operation of the second printer 12b.

Below, asynchronous duplex communication between the first print data communication unit 26a and the print data process unit 51 through the first function unit communication path KT1, and asynchronous duplex communication between the second print data communication unit 26b and the print data process unit 51 through the second function unit communication path KT2, are also described below.

As shown in FIG. 5 (A), the POS application execution unit 45a and printer driver execution unit 45b of the POS terminal control unit 45 of the POS terminal 8 generate print data including transaction information when processing a transaction at the checkout counter RC (step SC1). The print data is data instructing producing a receipt based on the transaction process at the checkout counter RC.

The print data generated in step SC1 is binary data.

Next, the POS terminal control unit 45 controls the terminal communication interface 46 and sends the print data to the receipt printer 12a (step SC2).

As shown in FIG. 5 (B), the first USB communication unit 34a receives the print data sent from the POS terminal 8 (step SD1). Next, the first USB communication unit 34a sends the received print data to the first communication control unit 25a (step SD2).

Next, the first communication control unit 25a sends the received print data to the first print control unit 29a and the first print data communication unit 26a (step SD3).

Based on the print data received from the first communication control unit 25a, the first print control unit 29a controls the first printer control unit 40a to execute the receipt printing process by the first print unit 41a (step SD4). In this embodiment of the invention the first print control unit 29a and first printer control unit 40a communicate by USB, but the communication protocol used by the first print control unit 29a and first printer control unit 40a is not limited to USB. Communication based on the Serial Peripheral Interface (SPI) specification or other communication specification may also be used.

Note also that the first printer control unit 40a is a control circuit that operates the first print unit 41a.

The first print unit 41a produces a first receipt as controlled by the first printer control unit 40a (step SD5).

A first receipt is described below.

FIG. 6 (A1) shows a first receipt RA as an example of a first receipt. This first receipt RA is a first receipt produced by the receipt printer 12a in the store system 11 of a store A with the store name A_Coffee.

FIG. 6 (B1) shows a first receipt RB as another example of a first receipt. This first receipt RB is a first receipt produced by the receipt printer 12a in the store system 11 of another store B with the store name B_Coffee, which is a different store than store A.

As will be clear by comparing FIG. 6 (A1) and FIG. 6 (B1), the layouts of the first receipt RA and the first receipt RB are different.

FIG. 6 (A2) is used to describe the layout of the first receipt RA, and FIG. 6 (B2) is used to describe the layout of the first receipt RB.

In FIG. 6 (A2) and (B2), the tags denoted by double angle brackets mean that information of the attribute expressed by the string between the double angle brackets is printed in that space. More specifically, the <<Date>> tag means that the date (Date) the receipt was issued is printed in the area corresponding to the <<Date>> tag, for example. Likewise, the <<Items>> tag means that the names of the purchased products (Items) are printed in the area corresponding to the <<Items>> tag. The <<Price>> tag means that the price (Price) of the purchased product is printed in the area corresponding to the <<Price>> tag. The <<Quantity>> tag means that the quantity (Quantity) of the product is printed in the area corresponding to the <<Quantity>> tag. The <<Total>> tag means that the total (Total) amount of the transaction is printed in the area corresponding to the <<Total>> tag. The <<Receipt No>> tag means that the identification number of the receipt (<<Receipt No>>) is printed in the area corresponding to the <<Receipt No>> tag. The <<Time>> tag means that the time the receipt is printed (Time) is printed in the area corresponding to the <<Time>> tag.

As shown in FIG. 6 (A1) and (A2), store name information indicating the name of the store (A_Coffee) is printed at the left end of the first line of the first receipt RA, and date stamp information indicating the date the receipt was printed is printed on the right beside the store name information. URL information indicating the URL of the website of the store is printed on the second line of the first receipt RA. Transaction details are printed below the URL information on the first receipt RA. Transaction detail in this example is information showing a set of product information on one line including the product name, the product price, and the quantity of the product purchased. The product name, the product price, and the quantity of the product purchased are printed sequentially from left to right in the transaction detail area of the first receipt RA. When plural products are purchased, plural lines are printed in the transaction detail area. Total purchase amount information indicating the total amount of the purchase is printed below the transaction details in the first receipt RA. The total purchase amount information in this example of a first receipt RA is information showing on one line the string "Total $" followed by a numeric string expressing the total amount of the transaction. Below the total purchase amount information in the first receipt RA is printed identification number information showing the identification number of the receipt. In this example of a first receipt RA, the identification number information is information showing on one line the string "Receipt Number No." followed by a number expressing the identification number of the receipt.

As shown in FIG. 6 (B1) and (B2), identification number information, date stamp information, and time stamp information indicating the time the receipt was printed are printed sequentially from left to right on the first line of the first receipt RB. On first receipt RB, the identification number information is information combining the string "Ticket #" and a number identifying the identification number of the receipt. The date stamp information of the first receipt RB represents the date in a different format than the date stamp information on the first receipt RA.

Store name information indicating the name of the store (B_Coffee) is printed below the first line of the first receipt RB. Specific information related to the transaction details is printed below the store name information of the first receipt RB, and the transaction details are printed below this specific information. In this first receipt RB, the transaction details include the quantity of the product purchased, the product name, and the product price printed sequentially from the left to right. Total purchase amount information is printed below the transaction details in the first receipt RB. The total purchase amount information in this example of a first receipt RB is information showing on one line the string "Total" followed by a numeric string expressing the transaction total. The string "thank you" is printed below the total purchase amount information on first receipt RB.

Is described above, the layouts (the order of information, the location of information, and the content of the printed information, for example) of first receipt RA and first receipt RB are different.

The layout of receipts issued by different stores may thus differ. The layout of a first receipt produced by a receipt printer 12a in the store system 11 of a particular store does not change unless the layout is changed intentionally by modifying the program of the POS terminal 8.

Referring again to FIG. 5, in step SD6, the first print data communication unit 26a receives the print data the first communication control unit 25a sent in step SD3, and executes the following process. The first print data communication unit 26a gets the first printer identification information data stored by the first printer storage unit 39a, and sends the acquired first printer identification information data and the received print data to the first communication unit 30a (step SD6).

The first communication unit 30a sends the received first printer identification information data and print data by the first WebSocket connection CT1 to the control server 10 (step SD7).

As shown in FIG. 5 (C), the first connection unit 54 of the control server 10 receives the first printer identification information data and the print data through the first WebSocket connection CT1 (step SE1). Next, the first connection unit 54 sends the received first printer identification information data and print data to the print data process unit 51 (step SE2).

Function blocks of the print data process unit 51 include a data analysis unit 51a and a data processing unit 51b.

The data analysis unit 51a of the print data process unit 51 executes an analysis process based on the received first printer identification information data and print data (step SE3).

This analysis process is described below.

Figure 7:
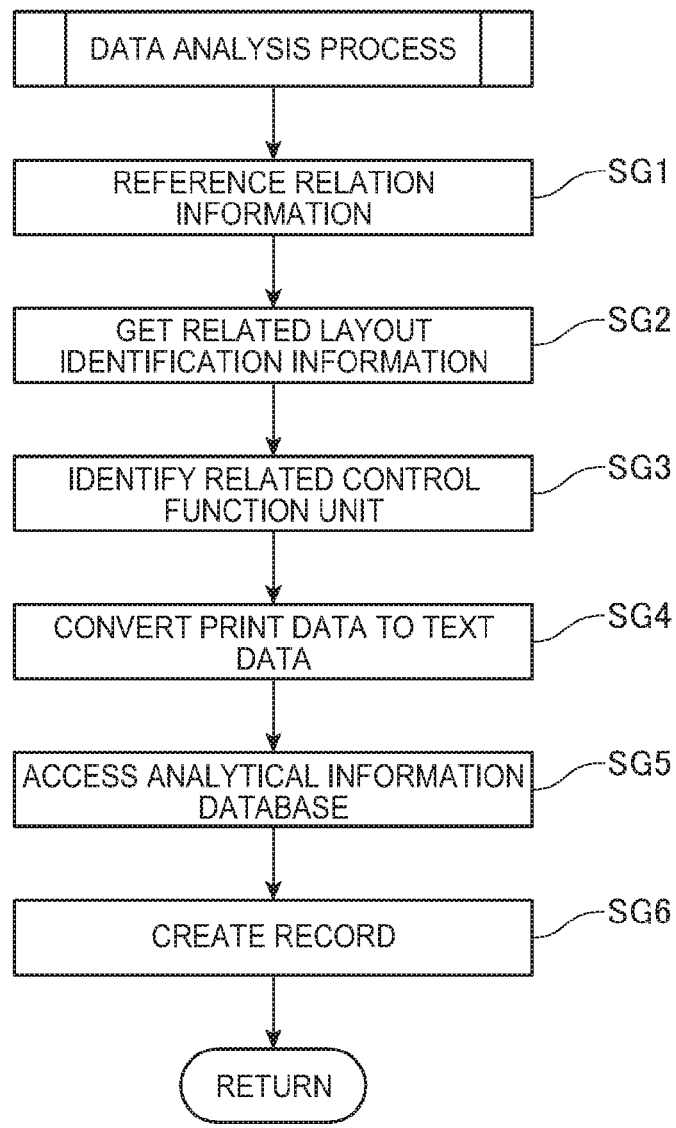
FIG. 7 is a flow chart of steps in the analytical process of the control server.

FIG. 7 is a flow chart showing steps in the analysis process.

As shown in FIG. 7, in the analysis process the data analysis unit 51a references relation information stored by the control server storage unit 57 (step SG1).

This relation information is information storing the relationship between printer identification information and layout identification information (layout information).

As described above, the layout of the receipts produced by the receipt printers 12a may differ according to differences in the receipt printers 12a.

The layout identification information is identification information assigned to each layout. A different value is therefore assigned as the layout identification information for different layouts.

Below, the layout of the first receipt RA shown in FIG. 6 (A1) is defined by layout LA, and the layout of the first receipt RB shown in FIG. 6 (B1) is defined by layout LB. The value of the layout identification information for layout LA, and the value of the layout identification information for layout LB, are different.

For each receipt printer 12a, the relation information stores the printer identification information of the receipt printer 12a relationally to the layout identification information of the layout of the first receipt printed by that receipt printer 12a.

For example, the relation information stores the relationship between the printer identification information of one receipt printer 12a and the layout identification information of the layout used by that receipt printer 12a; and stores the printer identification information of a second printer 12b that is different from the receipt printer 12a linked to the layout identification information of the layout used by that second printer 12b.

Next, using the first printer identification information identified by the received first printer identification information data as the search key, the data analysis unit 51a acquires the layout identification information related to the printer identification information from the relation information (step SG2).

Next, the data analysis unit 51*a* determines the control function unit corresponding to the layout identification information (step SG3). The relationship between the layout identification information and the control function unit is, for example, stored in a table defined in the program controlling the function of the data analysis unit 51*a*, and is recorded in information stored by the control server storage unit 57. The control function unit is a function block with the ability to analyze print data based on the layout identified by the layout identification information acquired in step SG2.

Next, the data analysis unit 51*a* converts the print data, which is binary data, to text data by means of the identified control function unit (step SG4). As a result, the print data is converted to data including strings (combinations of character codes) for the information printed on the first receipt, thereby enabling searching for a particular string by means of a string search.

Next, the data analysis unit 51*a* accesses the analytical information database by means of the control function unit (step SG5).

Next, the data analysis unit 51*a* analyzes the print data by the control function unit, and based on the result, creates a record in the analytical information database and fills the fields (items) with the appropriate data (step SG6).

Figure 8:
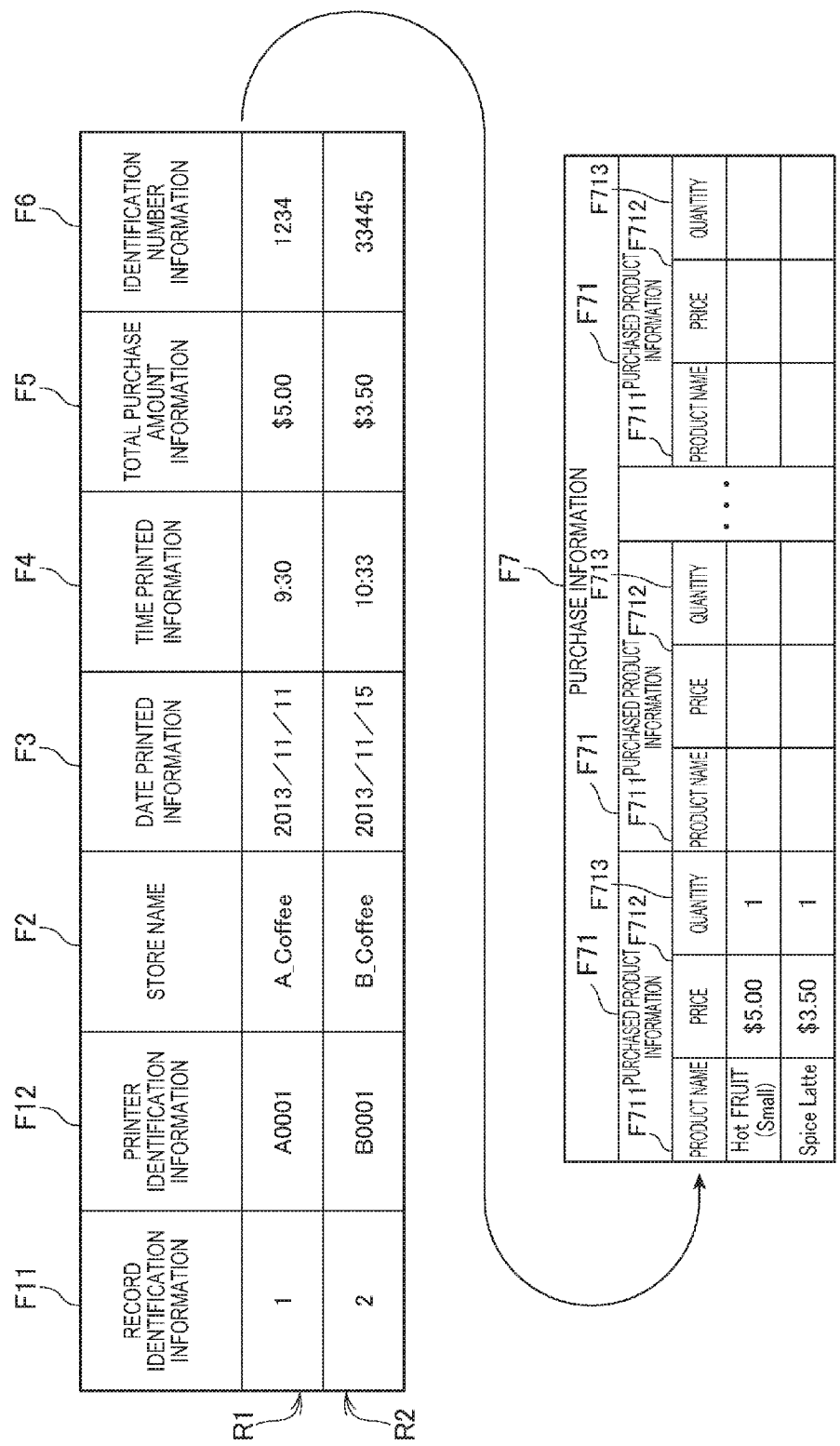
FIG. 8 shows an example of the data structure of one record in the analytical information database.

FIG. 8 shows an example of a record (referred to below as an "analytical information record") created in step SG6.

In FIG. 8, the first record R1 is a record created based on the first receipt RA (a first receipt of layout LA) shown in FIG. 6 (A1). The second record R2 is a record created based on the first receipt RB (a first receipt of layout LB) shown in FIG. 6 (B1).

As shown in FIG. 8, one record in the analytical information database has a record identification information field F11 that stores record identification information. The record identification information is information identifying a specific record. When generating a record, the data analysis unit 51*a* also generates record identification information that is different from the record identification information for any other record, and stores this value in the record identification information field F11.

One record in the analytical information database also has a printer identification information field F12 that stores printer identification information. The data analysis unit 51*a* stores the printer identification information in the printer identification information field F12 based on the received first printer identification information.

One record in the analytical information database also has a store name field F2. The data analysis unit 51*a* extracts the store name information from the print data according to the corresponding layout, and stores the store name information in the store name field F2. For example, the data analysis unit 51*a* extracts the store name information from the print data corresponding to layout LA based on the store name information printed at the left end of the first line. In the case of print data corresponding to layout LB, the data analysis unit 51*a* extracts the store name information based on the store name information printed below the first line.

One record in the analytical information database also has a date stamp information field F3. The data analysis unit 51*a* extracts and stores the date stamp information from the print data based on the corresponding layout in the date stamp information field F3.

For example, the data analysis unit 51*a* extracts the date stamp information from the print data corresponding to layout LA based on the date stamp information being printed on the right beside the store name information on the first line. Note that in layout LA the date stamp information is represented by the month in English, the day in numbers, and the year (Gregorian calendar) written in numbers as in Nov. 11, 2003. In this event, the data analysis unit 51*a* extracts the date stamp information, converts it to information in the format year number (Gregorian)/month number/day number, and stores it in the date stamp information field F3.

In the event of print data corresponding to layout LB, the data analysis unit 51*a* extracts the date stamp information based on the date stamp information being printed to the right of the identification number information on the first line. Note that in layout LB the date stamp information is expressed in the format month number/day number/year number (Gregorian) as in "11/15/2013". In this event, the data analysis unit 51*a* extracts the date stamp information, converts it to information in the format year number (Gregorian)/month number/day number, and stores it in the date stamp information field F3.

One record of the analytical information database also has a time stamp information field F4. The data analysis unit 51*a* extracts and stores the time stamp information from the print data based on the corresponding layout in the time stamp information field F4. Note that the time stamp information is not printed in layout LA.

In the case of print data corresponding to layout LA, the data analysis unit 51*a* calculates the time the first receipt was printed by the receipt printer 12*a* based on the print data, and stores time stamp information indicating the estimated time in the time stamp information field F4. For example, the data analysis unit 51*a* may use the time the print data is received from the receipt printer 12*a*, or the time adding the time required for data communication to the time the data was received, as the time the first receipt was printed.

In the case of print data corresponding to layout LB, the data analysis unit 51*a* extracts the time stamp information based on the time stamp information being printed on the right beside the date stamp information on the first line.

One record of the analytical information database also has a total purchase amount information field F5. The data analysis unit 51*a* extracts and stores the total purchase amount information from the print data according to the corresponding layout in the total purchase amount information field F5. For example, in the case of print data corresponding to layout LA, the data analysis unit 51*a* extracts the total purchase amount information by means of a string search based on the total purchase amount information including the string "Total $". A string search is used to extract the total purchase amount information because the number of lines in the transaction detail changes according to the purchased products in layout LA, and what line information printed below the transaction detail is printed on is not constant. Next, the data analysis unit 51*a* converts the extract total purchase amount information to information in a specific format (in this example, the currency unit ($) and a number indicating the amount), and stores the result in the total purchase amount information field F5.

In the case of print data corresponding to layout LB, the data analysis unit 51*a* extracts the total purchase amount information by a string search using string "Total". Next, the data analysis unit 51*a* converts the extracted total purchase amount information to information in a specific format, and stores the result to the total purchase amount information field F5.

One record of the analytical information database also has an identification number information field F6. The data analysis unit 51*a* extracts and stores the identification number information (information identifying the identification number of the receipt) from the print data according to the corresponding layout in the identification number information field F6.

For example, in the case of print data corresponding to layout LA, the data analysis unit 51a extracts the identification number information by a string search because the identification number information is printed with the string "Receipt Number No.", converts the extracted identification number information to a number identifying the identification number of the receipt, and stores the result in the identification number information field F6.

In the case of print data corresponding to layout LB, the data analysis unit 51a extracts the identification number information based on the identification number information being printed at the left end of the first line, converts the extracted information to a number representing the identification number of the receipt, and stores the result in the identification number information field F6.

One record of the analytical information database also includes a purchase information field F7.

The purchase information field F7 has multiple purchased product information fields F71.

The purchased product information field F71 includes a product name field F711, a price field F712, and a quantity field F713. The product name field F711 stores the information identifying the product name. The price field F712 stores information identifying the product price. The quantity field F713 stores information indicating the quantity purchased.

The data analysis unit 51a extracts the transaction detail information from the print data according to the appropriate layout, and based on the extracted transaction detail information stores the information in the appropriate fields of the purchased product information field F71. Note that the data analysis unit 51a stores product information for each purchased product in a purchased product information field F71. When plural different products are purchased, the data analysis unit 51a therefore stores the corresponding product information to the same number of purchased product information fields F71.

For example, in the case of print data corresponding to layout LA, the data analysis unit 51a extracts the transaction details based on there being one or more detail lines printed below the URL information and above the total purchase amount information. Next, the data analysis unit 51a acquires and stores the product name, price, and quantity information based on the extracted transaction details in the appropriate fields. When plural products are purchased, the data analysis unit 51a stores the information for each of the purchased products in the appropriate fields of the purchased product information field F71 of the corresponding product.

In the case of print data corresponding to layout LB, the data analysis unit 51a extracts the transaction detail information based on the one or more lines printed below the specific information (column headers) related to the details and above the total purchase amount information. Next, the data analysis unit 51a gets and stores the product name, price, and quantity information based on the extracted detail information, in the appropriate fields.

As shown in FIG. 5 (C), in response to transmission of the first printer identification information and print data to the print data process unit 51 by the first connection unit 54 in step SE2, the data processing unit 51b of the print data process unit 51 processes the print data and generates second receipt print data (step SE4).

The second receipt print data is control data for printing a second receipt by the second printer 12b.

A second receipt is a receipt produced by adding styling, a layout change, or other information to a first receipt. For example, the second receipt may be a receipt that adds a logo to the first receipt, changes the order of information in the receipt, or adds a 2D code recording a specific URL, for example. The transaction details, total purchase amount information, and other transaction information printed on a first receipt are also printed on the second receipt.

The data processing unit 51b manages the method of processing the print data relationally to the printer identification information, and generates second receipt print data using the corresponding method.

Next, the data processing unit 51b references the printer management database (step SE5). The printer management database is a database that, for each receipt printer 12a connected to the control server 10, relationally stores first printer identification information for receipt printer 12a to second printer identification information for a second printer 12b related to the receipt printer 12a. That a second printer 12b is related to a receipt printer 12a means in this example that the second printer 12b prints a second receipt based on the receipt printer 12a printing a first receipt. The receipt printer 12a and second printer 12b installed at the same checkout counter RC are related in this example.

Next, using the first printer identification information identified by the received first printer identification information data as the search key, the data processing unit 51b gets the second printer identification information related to the first printer identification information (step SE6).

Next, the data processing unit 51b references the connection management database and acquires the connection identification information related to the second printer identification information of the second printer 12b acquired in step SE6 (step SE7).

Next, the data processing unit 51b sends the generated second receipt print data to the second connection unit 55 corresponding to the WebSocket connection CT (second WebSocket connection CT2 in this example) identified by the connection identification information acquired in step SE7 (step SE8).

The second connection unit 55 then sends the received second receipt print data by the second WebSocket connection CT2 to the second printer 12b (step SE9).

As shown in FIG. 5(D), the second communication unit 30b of the second printer 12b receives the second receipt print data by the second WebSocket connection CT2 (step SF1). Next, the second communication unit 30b sends the received second receipt print data to the second print data communication unit 26b (step SF2).

The second print data communication unit 26b converts the received second receipt print data to a second print command, which is a command in the command language of the second print unit 41b (step SF3). The second print data communication unit 26b converts the second receipt print data, which is an XML file, to commands that can be analyzed by the second printer control unit 40b, which is a control circuit of the second print unit 41b.

Next, the second print data communication unit 26b sends the second print command to the second print control unit 29b (step SF4).

The second print control unit 29b establishes communication with the second printer control unit 40b, and based on the second receipt print data, controls the second printer control unit 40b to execute the process of printing a second receipt by the second print unit 41b (step SF5).

The second print unit 41b then prints a second receipt as controlled by the second printer control unit 40b (step SF6).

A first receipt is thus produced by the receipt printer 12a, and a second receipt is produced by a second printer 12b in the POS control system 1 according to this embodiment of the invention. There are situations, however, when a communication error occurs between the receipt printer 12a and the control server 10, and the receipt printer 12a cannot send print data to the control server 10. Even in this event, a receipt can be given to the customer because a first receipt printed with information related to the transaction is reliably produced.

Based on the analytical information database stored by the control server storage unit 57, the control server 10 can provide the following information in response to a request from the management device 14.

A web browser is installed on the management device 14. The user starts the web browser on the management device 14, and controls the management device 14 to access a specific URL managed by the control server 10 and acquire a specific user interface for inputting information required to display windows such as described in the following examples. The user then inputs information to the user interface, and confirms input. When input is confirmed, the management device 14 sends the input information to the control server 10 by a function of the web browser.

One function block of the server control unit 49 of the control server 10 is an information provider unit 49a. Based on information received from the management device 14, the information provider unit 49a generates a drawing file such as an HTML file for displaying a specific window, and sends the drawing file to the management device 14. Based on the received drawing file, the management device 14 displays the specific window by a function of the web browser.

Information the control server 10 provides to the management device 14 is described below with reference to examples of windows the control server 10 displays on the management device 14.

Note that the control server storage unit 57 of the control server 10 stores a store management database. The store management database is a database that, for each store, relationally stores store identification information, first printer identification information for the receipt printers 12a installed in the store, and second printer identification information for the second printers 12b installed in the store. The store identification information is identification information identifying a particular store, and is uniquely assigned to each store.

The control server storage unit 57 of the control server 10 also stores a product category database. The product category database is a database relationally storing for each store the names of the products sold in that store, the product categories, and the profit margin of the products.

FIG. 9 (A) shows an example of a window GM1 that the control server 10 displays on the management device 14 in response to a request from the management device 14.

This window GM1 shows a broken line graph of monthly sales in each store for a period specified by the management device 14, and the total monthly sales by each store, for stores specified by the management device 14.

To display this window GM1, the user displays a specific user interface on the management device 14, and inputs store identification information for one or more stores and information identifying the period (for example, January 2013 to May 2013) to the user interface. Fields for inputting the information are provided in the specific user interface. The above information is sent to the control server 10 in response to the input.

The information provider unit 49a of the control server 10 references the store management database, and based on the store identification information, acquires the first printer identification information for a receipt printer 12a installed in the specified store.

Next, the information provider unit 49a finds the records in the analytical information database related to the specified store and the specified period based on the printer identification information field F12 and the date stamp information field F3. Next, based on the total purchase amount information fields F5 in the acquired records, the information provider unit 49a calculates the sales by month in the specified period for the specified store. Next, based on the calculated result, the information provider unit 49a generates a drawing file for displaying a broken line graph in the format shown in FIG. 9 (A), sends the drawing file to the management device 14, and displays the window GM1.

FIG. 9 (B) shows another example of a window GM2 that the control server 10 displays on the management device 14 in response to a request from the management device 14.

This window GM2 shows a broken line graph of the percentage of the total monthly sales accounted for by the sales in each store in each month of a period specified by the management device 14 for the stores specified by the management device 14.

To display this window GM2, the user displays a specific user interface on the management device 14, and inputs store identification information for one or more stores and information identifying the period (for example, January 2013 to May 2013) to the user interface. Fields for inputting the information are provided in the specific user interface. The above information is sent to the control server 10 in response to the input.

The information provider unit 49a of the control server 10 references the store management database, and based on the store identification information, acquires the first printer identification information for a receipt printer 12a installed in the specified store.

Next, the information provider unit 49a finds the records in the analytical information database related to the specified store and the specified period based on the printer identification information field F12 and the date stamp information field F3. Next, based on the total purchase amount information fields F5 in the acquired records, the information provider unit 49a calculates the percentage of the total monthly sales accounted for by the sales in each store in each month of the specified period for each of the specified stores. Next, based on the calculated result, the information provider unit 49a generates a drawing file for displaying a broken line graph in the format shown in FIG. 9 (B), sends the drawing file to the management device 14, and displays the window GM2.

Figure 10B:
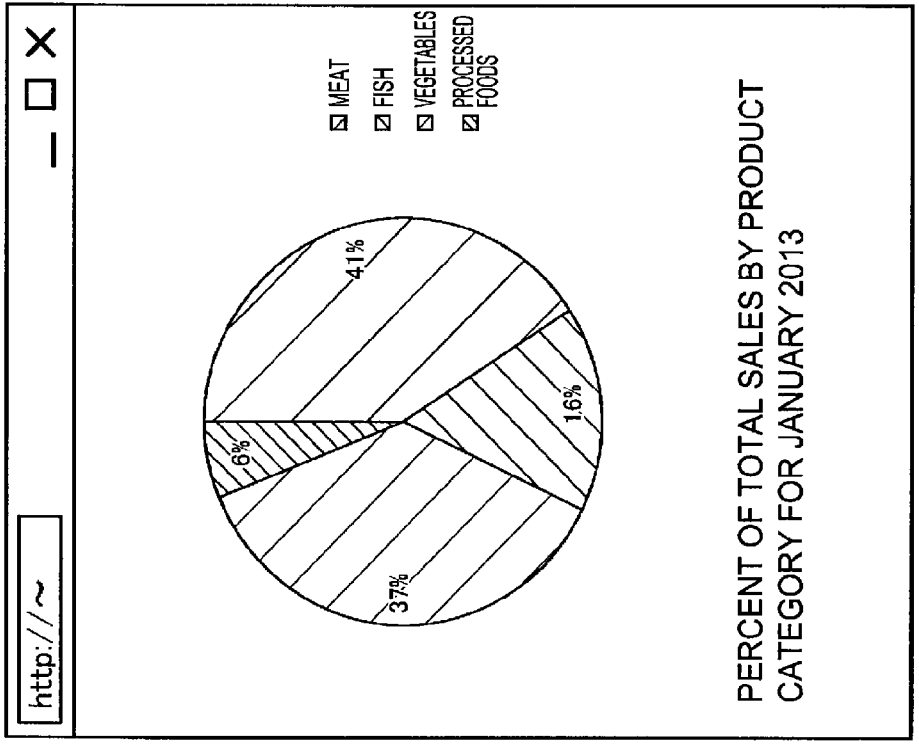
FIGS. 10(A) and 10(B) show examples of windows displayed by the control server based on the result of print data analysis.
Figure 10A:
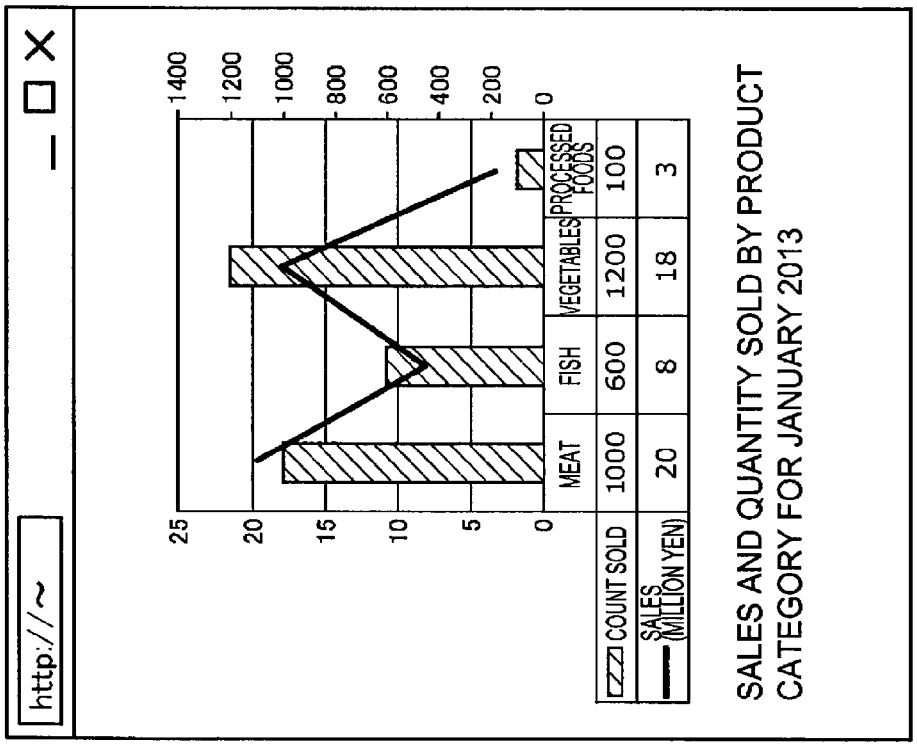

FIG. 10 (A) shows an example of a window GM3 that the control server 10 displays on the management device 14 in response to a request from the management device 14.

This window GM3 shows a broken line graph, a bar graph, and a table of the quantity sold and total sale amount by product category in one month specified by the management device 14 at one store specified by the management device 14.

To display this window GM3, the user displays a specific user interface on the management device 14, and inputs store identification information for one store and information identifying one month (for example, January 2013) to the user interface. Fields for inputting the information are provided in the specific user interface. The above information is sent to the control server 10 in response to the input.

The information provider unit 49*a* of the control server 10 references the store management database, and based on the store identification information, acquires the first printer identification information for a receipt printer 12*a* installed in the specified store.

Next, the information provider unit 49*a* finds the records in the analytical information database related to the specified store and the specified period based on the printer identification information field F12 and the date stamp information field F3. Next, the information provider unit 49*a* accesses the product category database and based on the purchase information fields F7 in the selected records, calculates the quantity sold and total sale amount by product category in one month specified by the management device 14. Next, based on the calculated result, the information provider unit 49*a* generates a drawing file for displaying information in the format shown in FIG. 10 (A), sends the drawing file to the management device 14, and displays the window GM3.

FIG. 10 (B) shows another example of a window GM4 that the control server 10 displays on the management device 14 in response to a request from the management device 14.

This window GM4 shows a pie graph of the percentage of total sales occupied by each category of products in the one store specified by the management device 14 in the one month specified by the management device 14.

To display this window GM4, the user displays a specific user interface on the management device 14, and inputs store identification information for one store and information identifying the one month (for example, January 2013) to the user interface. Fields for inputting the information are provided in the specific user interface. The above information is sent to the control server 10 in response to the input.

The information provider unit 49*a* of the control server 10 references the store management database, and based on the store identification information, acquires the first printer identification information for a receipt printer 12*a* installed in the specified store.

Next, the information provider unit 49*a* finds the records in the analytical information database related to the specified store and the specified period based on the printer identification information field F12 and the date stamp information field F3. Next, the information provider unit 49*a* accesses the product category database and based on the purchase information fields F7 in the selected records, calculates the percentage of total sales occupied by each category of products in the one store specified by the management device 14 in the one month specified by the management device 14. Next, based on the calculated result, the information provider unit 49*a* generates a drawing file for displaying the information in the format shown in FIG. 10 (B), sends the drawing file to the management device 14, and displays the window GM4.

Figure 11B:
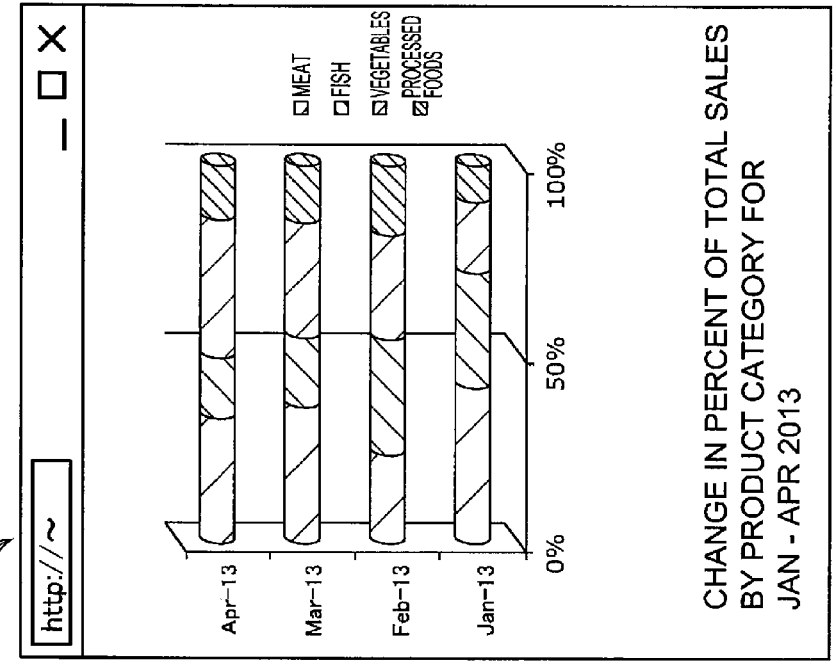
FIGS. 11(A) and 11(B) show examples of windows displayed by the control server based on the result of print data analysis.
Figure 11A:
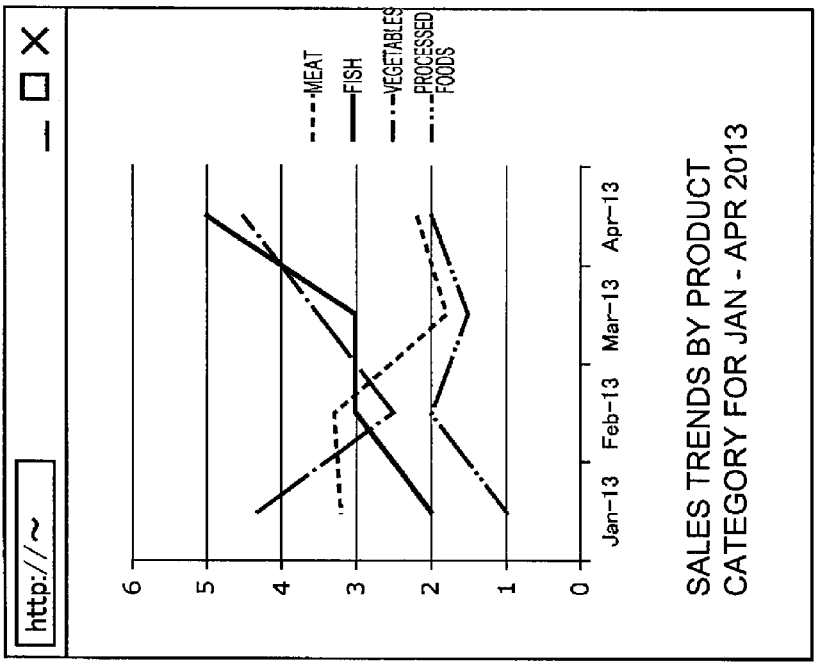

FIG. 11 (A) shows an example of a window GM5 that the control server 10 displays on the management device 14 in response to a request from the management device 14.

This window GM5 shows a broken line graph of sales by product category during a period specified by the management device 14 for one store specified by the management device 14.

To display this window GM5, the user displays a specific user interface on the management device 14, and inputs store identification information for the one store and information identifying the period (for example, January 2013 to April 2013) to the user interface. Fields for inputting the information are provided in the specific user interface. The above information is sent to the control server 10 in response to the input.

The information provider unit 49*a* of the control server 10 references the store management database, and based on the store identification information, acquires the first printer identification information for a receipt printer 12*a* installed in the specified store.

Next, the information provider unit 49*a* finds the records in the analytical information database related to the specified store and the specified period based on the printer identification information field F12 and the date stamp information field F3.

Next, the information provider unit 49*a* finds the records in the analytical information database related to the specified store and the specified period based on the printer identification information field F12 and the date stamp information field F3. Next, the information provider unit 49*a* accesses the product category database and based on the purchase information fields F7 in the selected records, calculates the change in sales for each product category in the period specified by the management device 14. Next, based on the calculated result, the information provider unit 49*a* generates a drawing file for displaying information in the format shown in FIG. 11 (A), sends the drawing file to the management device 14, and displays the window GM5.

FIG. 11 (B) shows another example of a window GM6 that the control server 10 displays on the management device 14 in response to a request from the management device 14.

This window GM6 shows a bar graph of the percentage of total sales occupied by each category of products in the one store specified by the management device 14 in the period specified by the management device 14.

To display this window GM6, the user displays a specific user interface on the management device 14, and inputs store identification information for one store and information identifying the period (for example, January 2013 to April 2013) to the user interface. Fields for inputting the information are provided in the specific user interface. The above information is sent to the control server 10 in response to the input.

The information provider unit 49*a* of the control server 10 references the store management database, and based on the store identification information, acquires the first printer identification information for a receipt printer 12*a* installed in the specified store.

Next, the information provider unit 49*a* finds the records in the analytical information database related to the specified store and the specified period based on the printer identification information field F12 and the date stamp information field F3. Next, the information provider unit 49*a* accesses the product category database and based on the purchase information fields F7 in the selected records, calculates the percentage of total sales occupied by each category of products in each month in the period specified by the management device 14. Next, based on the calculated result, the information provider unit 49*a* generates a drawing file for displaying the information in the format shown in FIG. 11 (B), sends the drawing file to the management device 14, and displays the window GM6.

Figure 12:
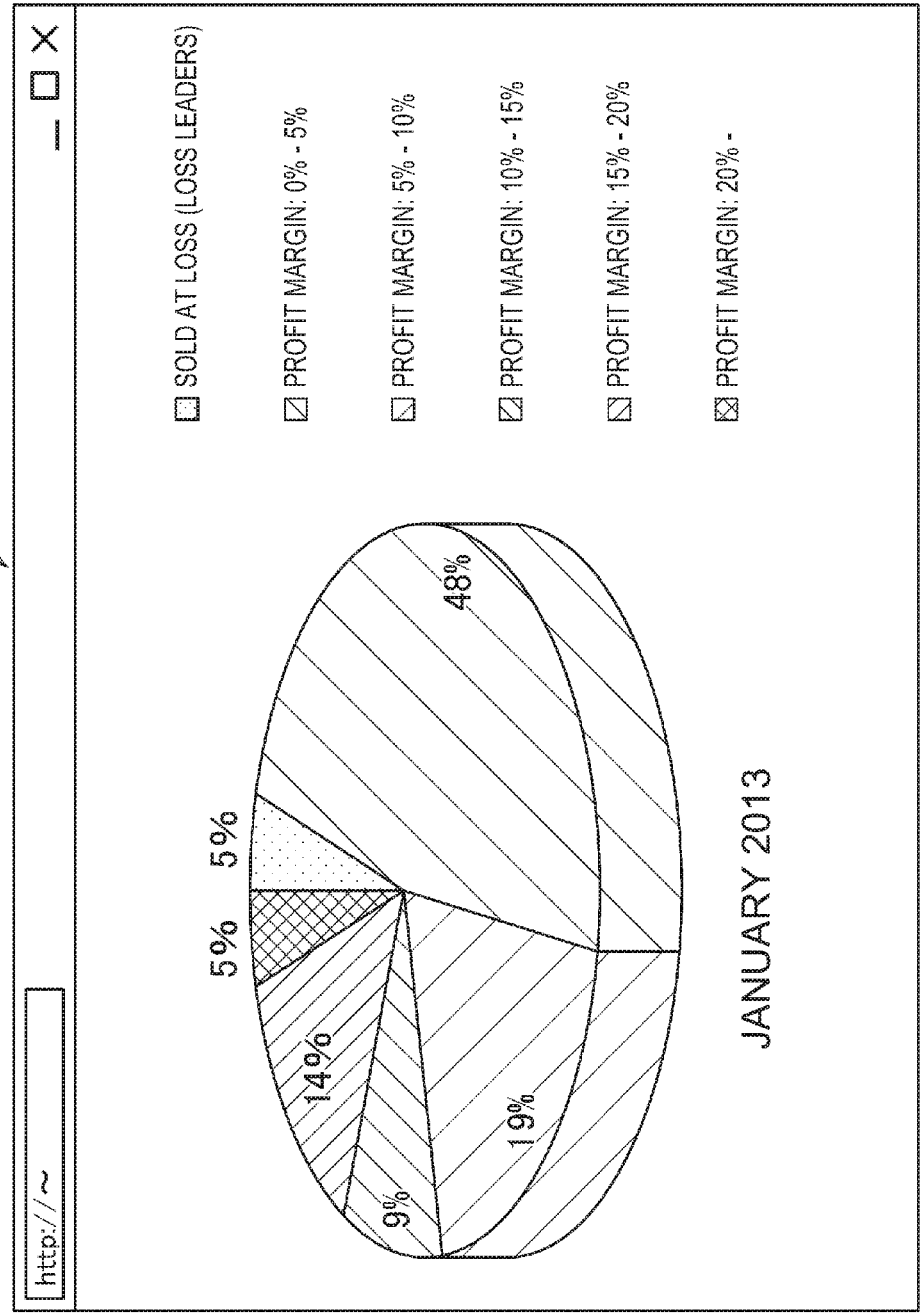
FIG. 12 shows an example of a window displayed by the control server based on the result of print data analysis.

FIG. 12 shows another example of a window GM7 that the control server 10 displays on the management device 14 in response to a request from the management device 14.

This window GM7 shows a pie graph of the relationship between the profit margin of products and sales of those products in the one store specified by the management device 14 in the one month specified by the management device 14.

To display this window GM7, the user displays a specific user interface on the management device 14, and inputs store identification information for one store and information identifying the one month (for example, January 2013) to the user interface. Fields for inputting the information are provided in the specific user interface. The above information is sent to the control server 10 in response to the input.

The information provider unit 49*a* of the control server 10 references the store management database, and based on the store identification information, acquires the first printer identification information for a receipt printer 12*a* installed in the specified store.

Next, the information provider unit 49*a* finds the records in the analytical information database related to the specified store and the specified period based on the printer identification information field F12 and the date stamp information field F3.

Next, the information provider unit 49*a* accesses the product category database and based on the purchase information fields F7 in the selected records, calculates the profit margin of the products and the sales of each product. Next, based on the calculated result, the information provider unit 49*a* generates a drawing file for displaying the information in the format shown in FIG. 12 sends the drawing file to the management device 14, and displays the window GM7.

Figure 13:
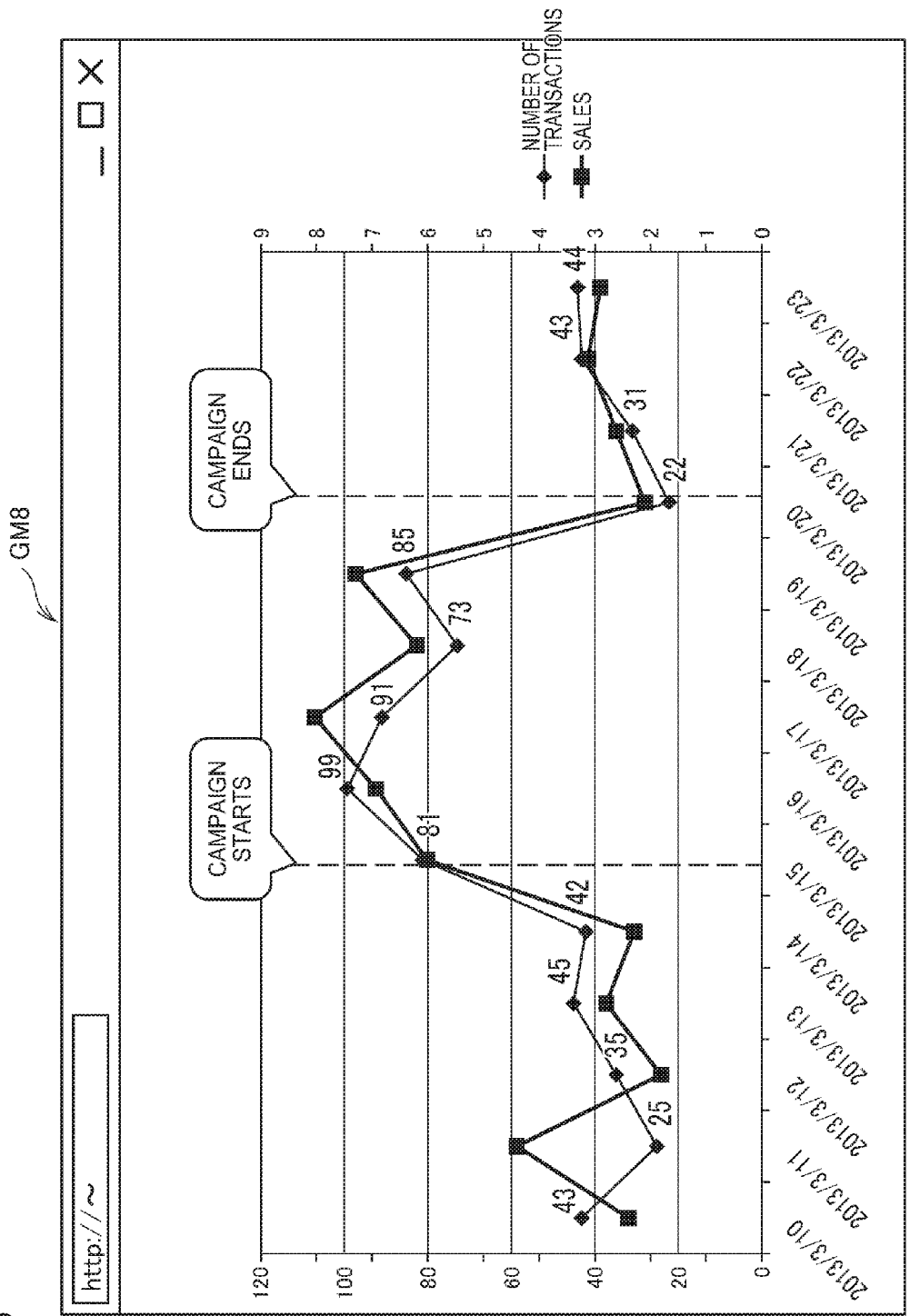
FIG. 13 shows an example of a window displayed by the control server based on the result of print data analysis.

FIG. 13 shows another example of a window GM8 that the control server 10 displays on the management device 14 in response to a request from the management device 14.

This window GM8 shows a broken line graph of store sales and the number of transactions each day during a period specified by the management device 14 for a store specified by the management device 14. If a campaign period is specified by the management device 14, the campaign period is clearly identified in the window GM8.

The number of transactions is the number of transactions (payments) made by customers that came to the store. Because first receipts are produced according to the customer transactions, the number of transactions can be acquired based on the number of first receipts printed.

To display this window GM8, the user displays a specific user interface on the management device 14, and inputs store identification information for one store and information identifying the period (for example, Mar. 10, 2013 to Mar. 23, 2013) to the user interface. As may be necessary, the user also inputs the campaign period. Fields for inputting the information are provided in the specific user interface. The above information is sent to the control server 10 in response to the input.

The information provider unit 49*a* of the control server 10 references the store management database, and based on the store identification information, acquires the first printer identification information for a receipt printer 12*a* installed in the specified store.

Next, the information provider unit 49*a* finds the records in the analytical information database related to the specified store and the specified period based on the printer identification information field F12 and the date stamp information field F3.

Next, the information provider unit 49*a* acquires the number of transactions per day based on the number of records recorded each day during the specified period. Next, the information provider unit 49*a* calculates the sales on each day included in the specified period based on the total purchase amount information field F5 in the selected records. Next, based on the acquired number of transactions and the calculated result, or based on the campaign period when a campaign period is specified, the information provider unit 49*a* generates a drawing file for displaying information in the format shown in FIG. 13, sends the drawing file to the management device 14, and displays the window GM8.

As described above, the POS control system 1 according to this embodiment of the invention includes a POS terminal 8, a receipt printer 12*a* (printing device), and control server 10 (data processing device).

The POS terminal 8 sends print data including transaction information.

The receipt printer 12*a* has a first USB communication unit 34*a* that receives print data sent by the POS terminal 8; a first printer storage unit 39*a* (identification information storage unit) that stores first printer identification information (identification information); a first print unit 41*a* (print unit) that prints; a first print control unit 29*a* that controls the first print unit 41*a* (print unit) based on print data; and a first communication unit 30*a* (transmission unit) that sends print data and first printer identification information data including the first printer identification information.

The control server 10 has a control server storage unit 57 (device storage unit) that stores relation information relating printer identification information to the layout for printing information based on the print data; a first connection unit 54 (connection unit) that receives the print data and first printer identification information sent by the receipt printer 12*a*; and a data analysis unit 51*a* that acquires the layout related to the printer identification information based on the relation information stored by the control server storage unit 57, and analyzes the print data by the method corresponding to the layout.

Thus comprised, the control server 10 can analyze print data by a method that corresponds to the print data and reflects the layout of the information print data based on the print data.

In this embodiment of the invention, the data analysis unit 51*a* of the control server 10 stores information based on analyzing the print data in the control server storage unit 57 (analytical result storage unit).

Thus comprised, the stored information can be used to execute processes such as analyzing sales based on transaction information.

In this embodiment of the invention, the control server 10 has a data communication unit 58 that sends information based on analysis of the print data by the data analysis unit 51*a*.

Thus comprised, information based on analyzing print data can be sent to an external device such as the management device 14, displayed by the external device based on the information, and the result of analysis by the data analysis unit 51*a* can be provided to the user referring to the display.

In this embodiment of the invention, the control server 10 has a data processing unit 51*b* that processes print data based on analysis of the print data by the data analysis unit 51*a*.

Thus comprised, the print data can be processed to generate print data producing a printout with a different layout, or to generate print data producing a printout with specific styling applied.

The second connection unit 55 (connection unit) of the control server 10 sends the print data (second receipt print data) processed by the data processing unit 51*b* to a second printer 12*b* (external device).

Thus comprised, the control server 10 can control the second printer 12b to print based on print data (second receipt print data) processed by the data processing unit 51b.

The invention is described above with reference to a preferred embodiment thereof, but the invention is not limited thereto and can be modified and adapted in many ways without departing from the scope of the accompanying claims.

For example, the control server 10 provides information to the management device 14 in the embodiment described above, but the information the control server 10 provides to the management device 14 or other external device is not limited to the information described above.

The receipt printer 12a and other devices are also disposed to a store system 11 used in a retail business in the foregoing embodiment. However, the devices are not necessarily limited to devices used in a store system 11. The devices may, for example, be used in a different type of system.

The function blocks shown in FIG. 3 can be embodied by hardware and software, and do not suggest a specific hardware configuration.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A POS system comprising:
a printing device; and
a data processing device connected to the printing device over a network;
the printing device including:
an identification information storage unit configured to store identification information about the printing device,
a print unit configured to print a receipt based on print data including transaction information,
a print control unit configured to control the print unit based on the print data, and
a transmission unit configured to transmit over the network the print data and the identification information to the data processing device; and
the data processing device including:
a relation information storage unit configured to store relation information linking layout information for the receipt printed by the print unit to the identification information,
a connection unit configured to receive over the network the print data and the identification information transmitted by the printing device, and
an analysis unit configured to acquire the layout information related to the identification information received by the connection unit based on the relation information stored in the relation information storage unit, and based on the acquired layout information, analyze the print data.

2. The POS system described in claim 1,
the data processing device including an analytical result storage unit configured to store analytical results based on analysis of the print data; and
the data processing device including a data communication unit configured to transmit the analytical results from the analytical result storage unit when receive a request is received.

3. The POS system described in claim 1,
the data processing device including a processing unit configured to process the print data based on the analytical results from the analysis unit.

4. The POS system described in claim 3, further comprising:
an external device configured to print;
wherein the connection unit of the data processing device is connected to the external device and is configured to transmit data processed by the processing unit to the external device.

5. The POS system described in claim 1, further comprising:
a second printing device including:
a second identification information storage unit configured to store second identification information,
a second print unit configured to print a second receipt based on second print data including transaction information,
a second print control unit configured to control the second print unit based on the second print data, and
a second transmission unit configured to transmit the second print data and the second identification information;
wherein:
the relation information storage unit of the data processing device is configured to store second relation information linking second layout information for the second receipt printed by the second print unit to the second identification information;
the connection unit of the data processing device is configured to receive the second print data and the second identification information transmitted by the second printing device; and
the analysis unit of the data processing device is configured to acquire the second layout information related to the second identification information received by the connection unit based on the second relation information stored in the relation information storage unit, and based on the acquired second layout information analyzes the second print data.

6. A data processing device connected to a printing device over a network, the data processing device comprising:
a connection unit configured to receive print data over the network from the printing device, the print data instructing printing a receipt, and configured to receive identification information about the printing device from which the print data is transmitted;
a relation information storage unit storing relation information that relationally stores layout information of the receipt printed based on the print data and the identification information; and
an analysis unit configured to acquire the layout information related to the identification information received by the connection unit based on the relation information stored in the relation information storage unit, and configured to analyze the print data based on the layout information.

7. The data processing device described in claim 6, wherein:
the data processing device has an analytical result storage unit configured to store analytical results based on analysis of the print data.

8. The data processing device described in claim 6, wherein:
the data processing device has a data communication unit configured to transmit the analytical results from the analysis unit.

9. The data processing device described in claim 6, wherein:
the data processing device has a processing unit configured to process the print data based on the analytical results from the analysis unit.

10. The data processing device described in claim 9, wherein:
the connection unit of the data processing device configured to transmit data processed by the processing unit.

11. A control method of a data processing device connected to a printing device over a network, the control method comprising:
receiving, via the network, print data including transaction information and identification information about, and transmitted by, the printing device, the printing device being configured to print a receipt based on the transaction information; and
analyzing the print data based on layout information related to the received identification information, by the data processing device.

12. The control method of a data processing device described in claim 11, further comprising:
storing analytical results based on the analyzing operation by the data processing device.

13. The control method of a data processing device described in claim 12, further comprising:
transmitting the analytical results by the data processing device.

14. The control method of a data processing device described in claim 12, further comprising:
processing the print data based on the analytical results by the data processing device.

15. The control method of a data processing device described in claim 14, further comprising:
transmitting the processed data by the data processing device.

16. A printing device connected to a data processing device over a network, the printing device comprising:
an identification information storage unit configured to store identification information about the printing device;
a print unit configured to print a receipt based on print data including transaction information;
a print control unit configured to control the print unit based on the print data; and
a transmission unit configured to transmit over the network the print data and the identification information to the data processing device, the data processing device being configured to receive, via the network, the print data and identification information transmitted by the transmission unit and analyze the print data based on layout information related to the received identification information.

* * * * *